United States Patent
Inoue et al.

(10) Patent No.: US 10,823,964 B2
(45) Date of Patent: Nov. 3, 2020

(54) WORK ASSISTANCE APPARATUS, WORK ASSISTANCE METHOD, AND COMPUTER-READABLE, NON-TRANSITORY RECORDING MEDIUM RECORDING WORK ASSISTANCE PROGRAM EXECUTED BY COMPUTER

(71) Applicant: Olympus Corporation, Hachioji-shi (JP)

(72) Inventors: Kanako Inoue, Hachioji (JP); Daisuke Tainaka, Hachioji (JP); Tatsuyuki Uemura, Hachioji (JP); Naoki Fujii, Hachioji (JP); Kazuhiko Osa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/172,715

(22) Filed: Oct. 26, 2018

(65) Prior Publication Data

US 2019/0129179 A1    May 2, 2019

(30) Foreign Application Priority Data

Nov. 2, 2017 (JP) .................................. 2017-213130

(51) Int. Cl.
*G02B 27/01* (2006.01)
*G06F 3/01* (2006.01)
*G06T 19/00* (2011.01)

(52) U.S. Cl.
CPC ............ *G02B 27/017* (2013.01); *G06F 3/011* (2013.01); *G06F 3/017* (2013.01); *G06T 19/006* (2013.01); *G02B 2027/0138* (2013.01); *G02B 2027/0178* (2013.01)

(58) Field of Classification Search
CPC .............. G02B 27/017; G02B 27/0172; G02B 27/0176; G02B 2027/0174; G02B 2027/0178; G06T 19/006; H04N 13/332–344; G06F 3/017
See application file for complete search history.

(56) References Cited

U.S. PATENT DOCUMENTS

| | | | |
|---|---|---|---|
| 7,036,090 B1 * | 4/2006 | Nguyen ................ | G06F 3/0482 348/E5.002 |
| 7,036,091 B1 * | 4/2006 | Nguyen ................ | G06F 3/0482 348/E5.002 |
| 8,836,703 B2 * | 9/2014 | Venon ............... | H04M 1/72519 345/428 |
| 2014/0098102 A1 * | 4/2014 | Raffle .................... | G06F 3/0482 345/440 |

(Continued)

FOREIGN PATENT DOCUMENTS

JP       08-006708       1/1996

*Primary Examiner* — Gene W Lee
(74) *Attorney, Agent, or Firm* — John C. Pokotylo; Pokotylo Patent Services

(57) ABSTRACT

A work assistance apparatus includes: a display panel configured to form a virtual display area within a field of view of a user; a camera configured to pick up an image in front of the user and output a picked-up image; and a processor configured to move at least one display component for operation within a display image in the virtual display area when a finger of the user alternately moves in a frontward direction and a backward direction of the user within the picked-up image.

12 Claims, 13 Drawing Sheets

(56) References Cited

U.S. PATENT DOCUMENTS

| | | | | |
|---|---|---|---|---|
| 2014/0101592 A1* | 4/2014 | Costa | ................... | G06F 3/0484 |
| | | | | 715/772 |
| 2014/0361988 A1* | 12/2014 | Katz | ...................... | G06F 3/011 |
| | | | | 345/156 |
| 2017/0184861 A1* | 6/2017 | Lammers-Meis | ...... | F16M 13/04 |
| 2018/0060264 A1* | 3/2018 | Pinn | ................... | G06F 9/44505 |

* cited by examiner

WORK ASSISTANCE APPARATUS, WORK ASSISTANCE METHOD, AND COMPUTER-READABLE, NON-TRANSITORY RECORDING MEDIUM RECORDING WORK ASSISTANCE PROGRAM EXECUTED BY COMPUTER

CROSS-REFERENCE TO RELATED APPLICATION

This application is based upon and claims the benefit of priority from the Japanese Patent Application No. 2017-213130, filed on Nov. 2, 2017; the entire contents of which are incorporated herein by reference.

BACKGROUND OF INVENTION

1. Field of the Invention

The present invention relates to a work assistance apparatus, a work assistance method, and a computer-readable, non-transitory recording medium recording a work assistance program executed by a computer.

2. Description of the Related Art

Conventionally, a head-mounted display apparatus mounted on a head of a user has been provided. For example, Japanese Patent Application Laid-Open Publication No. 8-6708 discloses a display apparatus of a head-mounted type that is mounted on a head of an operator, virtually displays an icon through a display section as if the icon exists at a predetermined location in a space, and activates processing associated with the icon when the operator moves a finger to the location where the icon appears to exist and makes a click operation by pushing the icon with the finger.

SUMMARY OF THE INVENTION

A work assistance apparatus according to an aspect of the present invention includes: a display panel configured to form a virtual display area within a field of view of a user; a camera configured to pick up an image in front of the user and output a picked-up image; and a processor configured to move at least one display component for operation within a display image in the virtual display area when a finger of the user alternately moves in a frontward direction and a backward direction of the user within the picked-up image.

A work assistance method according to another aspect of the present invention includes: by a display panel, forming a virtual display area within a field of view of a user; by a camera, picking up an image in front of the user and outputting a picked-up image; and by a processor, moving at least one display component for operation within a display image in the virtual display area when a finger of the user alternately moves in a frontward direction and a backward direction of the user within the picked-up image.

A computer-readable, non-transitory recording medium recording a work assistance program executed by a computer according to yet another aspect of the present invention causes the computer to execute: a code configured to form a virtual display area within a field of view of a user; a code configured to pick up an image in front of the user and output a picked-up image; and a code configured to move at least one display component for operation within a display image in the virtual display area when a finger of the user alternately moves in a frontward direction and a backward direction of the user within the picked-up image.

DETAILED DESCRIPTION OF THE PREFERRED EMBODIMENT(S)

Hereinafter, embodiments of the present invention will be described with reference to drawings.

First Embodiment

Figure 1:
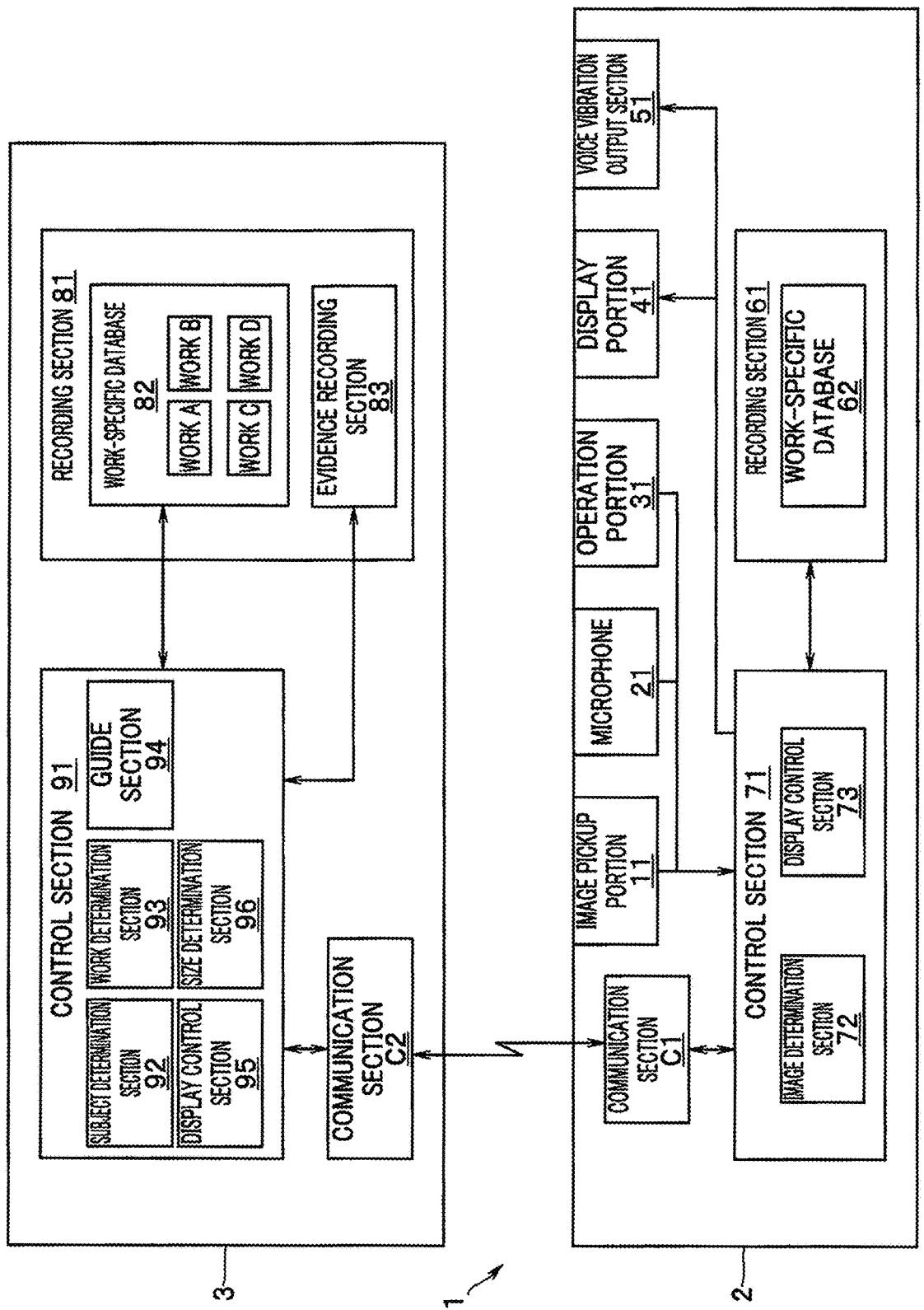
FIG. 1 is a block diagram showing an example of a configuration of a work assistance apparatus, according to a first embodiment of the present invention.
Figure 2:
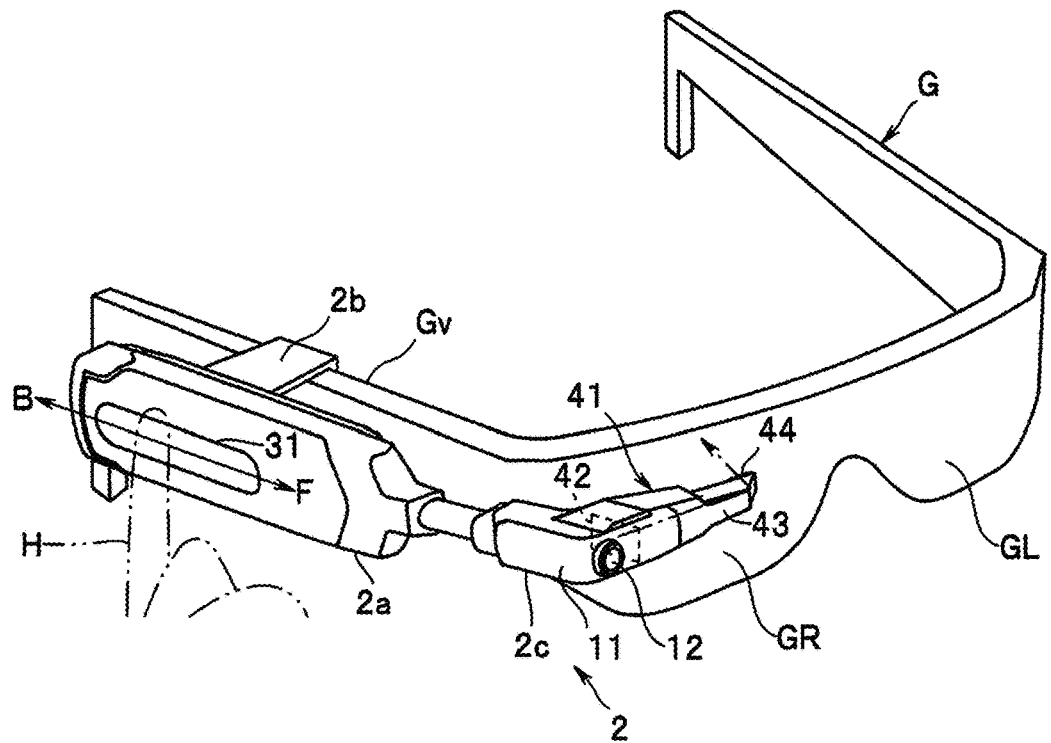
FIG. 2 is a view showing an example of a wearable terminal of the work assistance apparatus, according to the first embodiment of the present invention.

FIG. 1 is a block diagram showing an example of a configuration of a work assistance apparatus 1 according to a first embodiment of the present invention. FIG. 2 is a view showing an example of a wearable terminal 2 of the work assistance apparatus 1 according to the first embodiment of the present invention.

As shown in FIG. 1, the work assistance apparatus 1 includes the wearable terminal 2 and a work determination apparatus 3.

Configuration of the Wearable Terminal 2

The wearable terminal 2 will be described.

The wearable terminal 2 is a head-mounted display apparatus that can be mounted on a head. In FIG. 2, the wearable terminal 2 is attached to a temple Gv of glasses G with a mounting portion 2b provided to a circuit accommodation portion 2a. That is, the mounting portion 2b can be attached to a head of a user. The wearable terminal 2 includes an image pickup portion 11, a microphone 21, an operation portion 31, a display portion 41, a recording section 61, a communication section C1, a voice vibration output section 51, and a control section 71.

The image pickup portion 11 includes a camera 12. As shown in FIG. 2, the camera 12 is provided at a front portion 2c that extends frontward from the circuit accommodation portion 2a. When the user wears the wearable terminal 2 on the head, the camera 12 is able to pick up images in a range including a whole of a real field of view Vu of the user. The image pickup portion 11 outputs a picked-up image obtained by the camera 12 to the control section 71.

The microphone 21 is provided at the front portion 2c and converts collected external voice into a voice signal and outputs the voice signal to the control section 71. The user can also make an instruction input by using voice through the microphone 21. Note that the microphone 21 may be provided at the circuit accommodation portion 2a.

Figure 8:
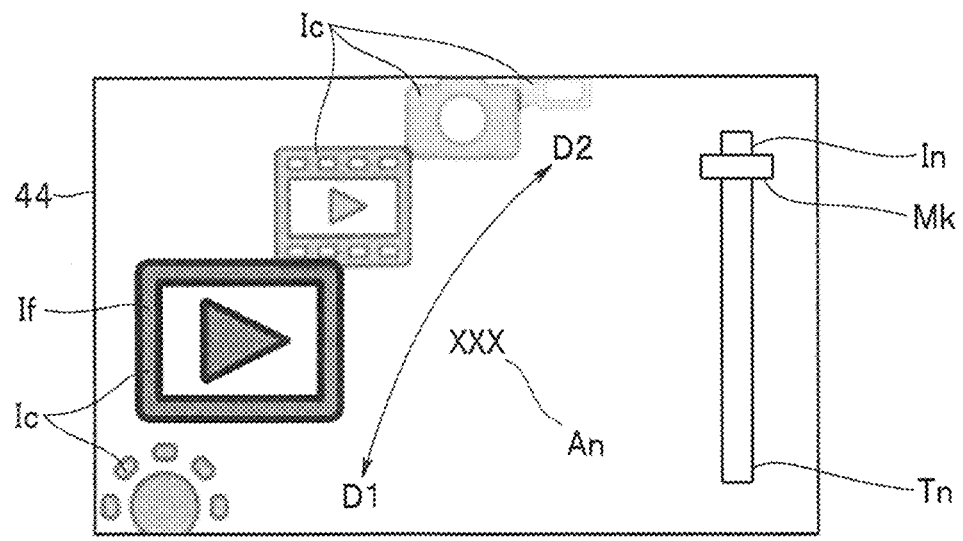
FIG. 8 is an explanatory diagram for explaining an example of composition of a display image on the wearable terminal of the work assistance apparatus, according to the first embodiment of the present invention.

The operation portion 31 is provided at the circuit accommodation portion 2a and includes a touch sensor formed such as to extend frontward and backward. By touching and sliding the operation portion 31 in a frontward direction F with a finger H, it is possible to make an instruction input for icon movement to circulate icons Ic in a first direction D1 (FIG. 8). Moreover, by touching and sliding the operation portion 31 in a backward direction B with the finger H, it is possible to make an instruction input for icon movement to circulate the icons Ic in a second direction D2 opposite to the first direction D1. By tapping the operation portion 31 with the finger H, it is possible to make an instruction input for icon determination, which is an instruction input for display-component-for-operation determination. When an instruction input is received, the operation portion 31 converts the instruction input into a control signal and outputs the control signal to the control section 71.

Each icon Ic is a display component for operation. An instruction input for icon movement is an instruction input for display-component-for-operation movement. An instruction input for icon determination is an instruction input for display-component-for-operation determination.

The display portion 41 is disposed in front of a right lens GR of the glasses G and displays an image inputted from the control section 71. The display portion 41 includes a display panel 42, a light guide portion 43, and a light exit face 44.

The display panel 42 is provided at the front portion 2c and outputs picture light based on a control signal inputted from the control section 71 to the light guide portion 43.

The light guide portion 43 is formed to have, for example, a narrow width of 4 mm or less, extends from the front portion 2c toward a front of the right lens GR of the glasses G, and guides the picture light inputted from the display panel 42 to the light exit face 44.

The light exit face 44 is disposed in front of a right eye of the user and projects the picture light guided by the light guide portion 43 onto the right eye (a dot-and-dash line in FIG. 2).

Figure 3:
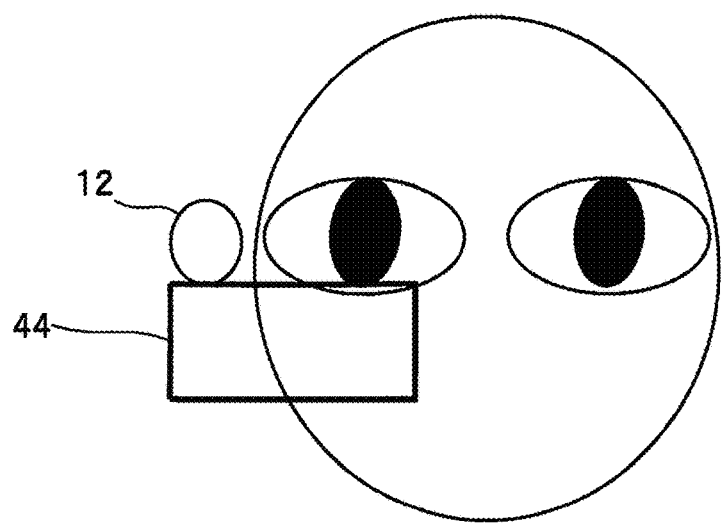
FIG. 3 is an explanatory diagram for explaining a positional relation between an eye of a user and the wearable terminal of the work assistance apparatus, according to the first embodiment of the present invention.
Figure 4:
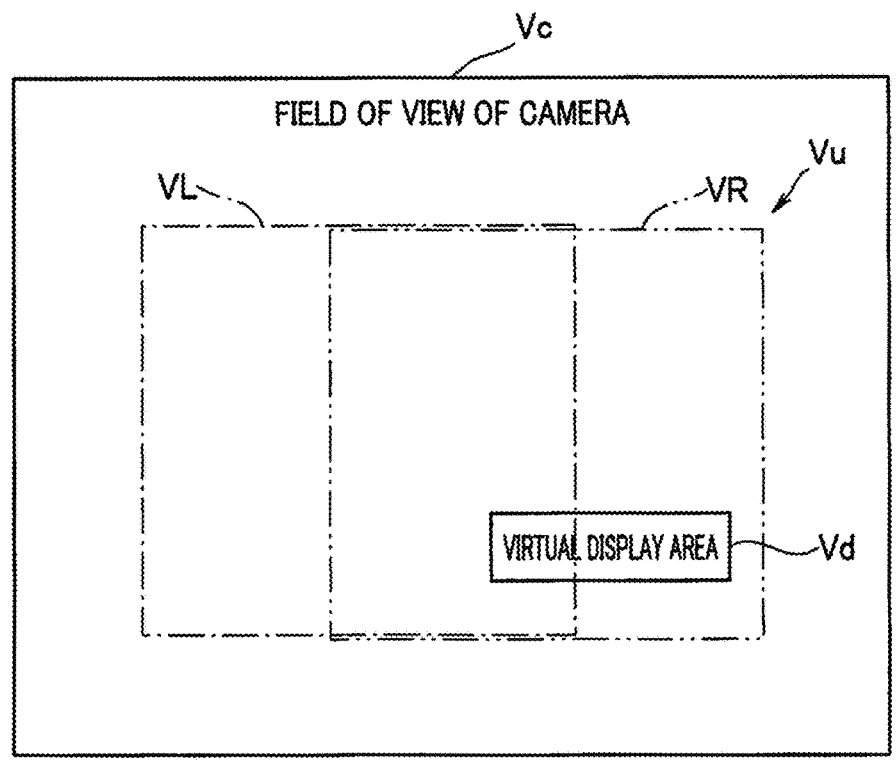
FIG. 4 is an explanatory diagram for explaining a real field of view of the user, a field of view of a camera, and a virtual display area on the wearable terminal of the work assistance apparatus, according to the first embodiment of the present invention.

FIG. 3 is an explanatory diagram for explaining a positional relation between the eye of the user and the wearable terminal 2 of the work assistance apparatus 1, according to the first embodiment of the present invention. FIG. 4 is an explanatory diagram for explaining the real field of view Vu of the user, a field of view Vc of the camera, and a virtual display area Vd on the wearable terminal 2 of the work assistance apparatus 1, according to the first embodiment of the present invention.

As shown in FIG. 3, the display portion 41 projects the picture light from the light exit face 44, which is disposed in front, onto the right eye. The camera 12 is disposed such as to look to a front of the user and picks up images within a range including the whole of the real field of view Vu of the user.

As shown in FIG. 4, a left field of view VL is a field of view passing through a left lens GL. A right field of view VR is a field of view passing through the right lens GR. The real field of view Vu of the user includes the left field of view VL and the right field of view VR. The virtual display area Vd is formed in lower right of the real field of view Vu by the picture light outputted from the light exit face 44. The virtual display area Vd is perceived to be transparent so that the user can perceive the virtual display area Vd and also a subject seen in back of the virtual display area Vd. The field of view Vc of the camera is configured to include the whole of the real field of view Vu of the user. The field of view Vc of the camera may be configured to be larger than the real field of view Vu. Note that the right lens GR and the left lens GL may be plain glass. The right lens GR and the left lens GL do not need to be provided.

Referring back to FIG. 1, the voice vibration output section 51 is provided at the circuit accommodation portion 2a. The voice vibration output section 51 can generate voice and vibration based on a voice signal inputted from the control section 71.

The recording section 61 is provided at the circuit accommodation portion 2a and includes a memory device such as a readable and writable flash ROM. The recording section 61 includes a work-specific database 62, as well as data and programs for various processing sections to be executed by the control section 71.

In the work-specific database 62, work procedure information, which is information on a procedure related to predetermined work, is stored. The work procedure information includes information on, for example, a predetermined reference image, a predetermined guide message for urging work, and a predetermined alarm message.

The communication section C1 is provided at the circuit accommodation portion 2a and is a circuit configured to perform wired or wireless communication with the work determination apparatus 3 via a network such as a LAN or the Internet, under control of the control section 71.

Figure 5:
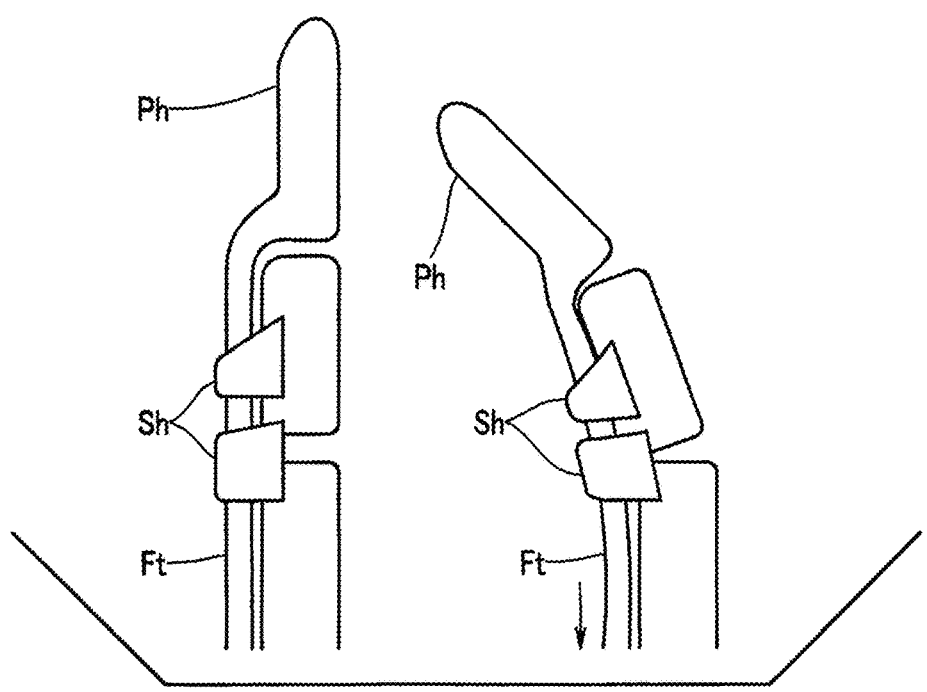
FIG. 5 is an explanatory diagram for explaining a structure of a finger to make an instruction input to the wearable terminal of the work assistance apparatus, according to the first embodiment of the present invention.
Figure 6:
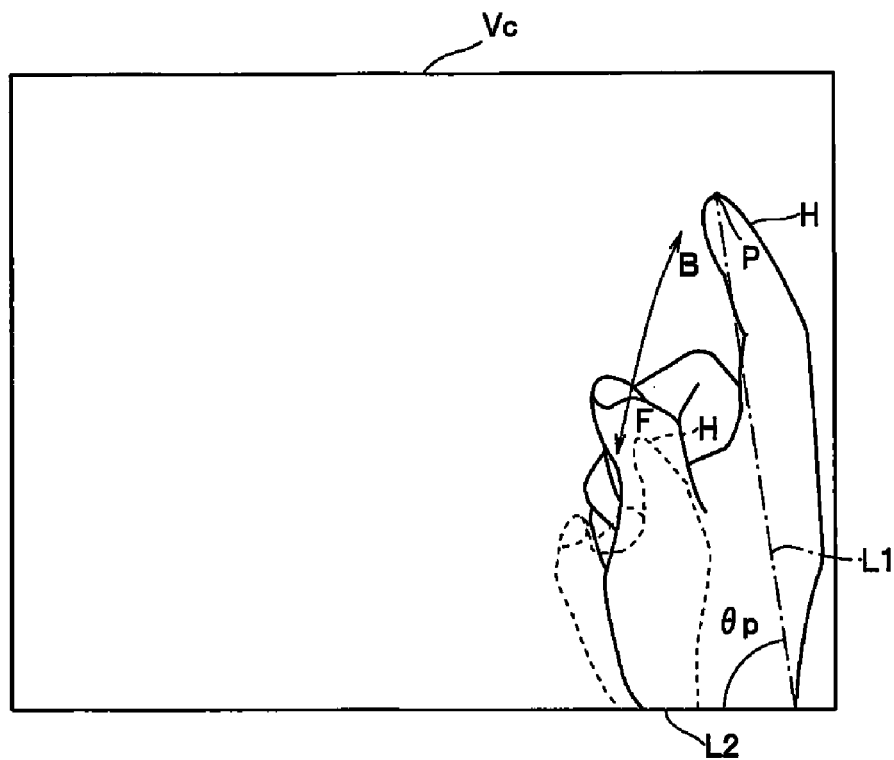
FIG. 6 is an explanatory diagram for explaining an action of the finger to make an instruction input to the wearable terminal of the work assistance apparatus, according to the first embodiment of the present invention.
Figure 7:
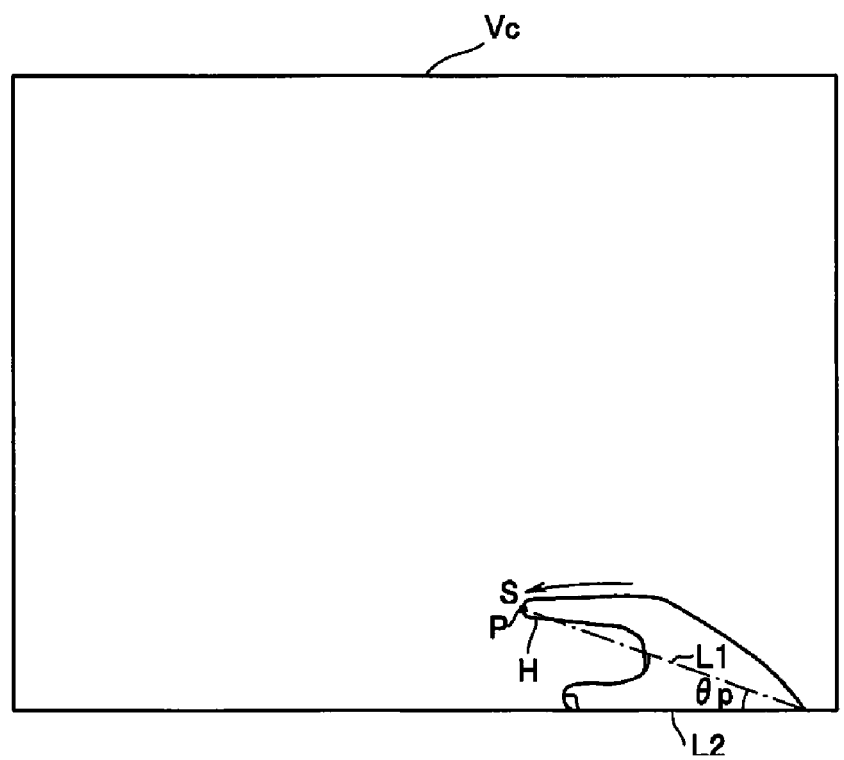
FIG. 7 is an explanatory diagram for explaining an example of the action of the finger to make an instruction input to the wearable terminal of the work assistance apparatus, according to the first embodiment of the present invention.

FIG. 5 is an explanatory diagram for explaining a structure of the finger to make an instruction input to the wearable terminal 2 of the work assistance apparatus 1, according to the first embodiment of the present invention. FIG. 6 is an explanatory diagram for explaining an action of the finger H to make an instruction input to the wearable terminal 2 of the work assistance apparatus 1, according to the first embodiment of the present invention. FIG. 7 is an explanatory diagram for explaining an example of the action of the finger H to make an instruction input to the wearable terminal 2 of the work assistance apparatus 1, according to the first embodiment of the present invention.

As shown in FIG. 5, the finger H to make an instruction input to the wearable terminal 2 is bent by flexor tendon Ft, which is sheathed in tendon sheath Sh, pulling phalange Ph. Since the wearable terminal 2 is basically operated under a situation in which the user is unable to take hands off during work, an assumed situation is that only a forefinger can be freely moved while thumbs and other fingers support a subject of operation or hold a tool and therefore cannot be freely moved. In addition, during work, hands are seen from a bottom of a screen, in which case when the forefinger is stretched, the forefinger is detected extending toward a top or a center part of the screen. Detection is performed specifically in such a situation as described above, and an erroneous action and a malfunction are prevented. Accordingly, it is important that the forefinger be certainly detected and changes of the forefinger be captured. Here, design is made with an ergonomic perspective.

The control section 71 is provided at the circuit accommodation portion 2a and controls an action of each of the portions and sections in the wearable terminal 2. The control section 71 includes a processor such as a CPU. Functions of the control section 71 are implemented by reading and executing the programs recorded in the recording section 61 for the various processing sections and for various applications to be activated by the icons Ic.

The control section 71 includes processing sections of an image determination section 72 and a display control section 73.

When the finger H of the user is detected in a picked-up image inputted from the image pickup portion 11, the image determination section 72 determines whether an action of the finger H of the user indicates either an instruction input for icon movement or an instruction input for icon determination, and outputs a determination result to the display control section 73.

The image determination section 72 performs predetermined finger detection processing and detects the finger H from the picked-up image. In the predetermined finger detection processing, for example, a shape is extracted based on an inclination from each adjacent pixel, and a degree of similarity to preset finger H model information is calculated and compared with a predetermined threshold value, whereby the finger H is detected. The predetermined finger detection processing is not limited to the aforementioned processing. For example, a degree of similarity may be calculated by predetermined arithmetic operation based on a weight learned through a machine learning technology. A degree of similarity calculated based on brightness may be subjected to determination, or a degree of similarity calculated based on color may be subjected to determination.

When the finger H is detected, the image determination section 72 determines an action of the finger H. As shown in FIG. 6, an action indicating an instruction input for icon movement is performed, for example, by an action of moving the finger H frontward and backward in front of the camera 12. When the finger H moves in the backward direction B, the finger H appears in a large size in the picked-up image, and a fingertip P is upright and points to an upper part of the picked-up image (a solid line in FIG. 6). When the finger H moves in the frontward direction F, the finger H appears in a small size in the picked-up image and moves downward (a broken line in FIG. 6).

The image determination section 72 calculates a proportion of an area of the finger H to an area of the picked-up image and a finger angle θp of the fingertip P. For example, the finger angle θp is calculated from an angle between a line L1 connecting a back of the hand and the fingertip P and a lower end edge L2 of the picked-up image.

When each of the proportion of the area and the finger angle θp is within a predetermined first range, the image determination section 72 determines that the finger H moves in the backward direction B. When each of the proportion of the area and the finger angle θp is within a predetermined second range, the image determination section 72 determines that the finger H moves in the frontward direction F. The predetermined first range and the predetermined second range are set experientially or experimentally so that an action of the finger H in the frontward direction F and the backward direction B can be detected.

When alternate actions of the finger H in the frontward direction F and the backward direction B are detected a predetermined number of times, the image determination section 72 determines that the actions indicate an instruction input for icon movement. The predetermined number of times are set experientially or experimentally so that an erroneous action can be prevented.

The image determination section 72 determines which of the first direction D1 and the second direction D2 the instruction input indicates, based on a difference between an action of the finger H in the frontward direction F and an action of the finger H in the backward direction B. For example, when a speed of movement of the finger H in the frontward direction F is faster than a speed of movement of the finger H in the backward direction B, the image determination section 72 determines that the instruction input is to move the icons Ic in the first direction D1. On the other hand, when movement of the finger H in the backward direction B is faster than movement of the finger H in the frontward direction F, the image determination section 72 determines that the instruction input is to move the icons Ic in the second direction D2.

As shown in FIG. 7, an instruction input for icon determination is performed, for example, by an action of moving the finger H in a sideward direction S in front of the camera 12. The instruction input for icon determination may be performed by an action of bending the finger H in the sideward direction S. Since the finger H is bent by the flexor tendon Ft pulling the phalange Ph, the fingertip P points to a palmar side when the finger H is bent. When the finger H moves in the sideward direction S, the fingertip P is brought down and thereby points to a side part of the picked-up image.

When the finger angle θp is within a predetermined third range, the image determination section 72 determines that the finger H moves in the sideward direction S. The predetermined third range is set experientially or experimentally so that an action of the finger H in the sideward direction S can be detected and that finger angles θp within the predetermined third range are smaller than finger angles θp within the predetermined first range and the predetermined second range.

When an action of the finger H in the sideward direction S is detected a predetermined number of times, the image determination section 72 determines that the actions indicate an instruction input for icon determination.

When a rotational action of the finger H as if drawing a circle is detected, the image determination section 72 may be configured to determine that the action corresponds to neither an instruction input for icon movement nor an instruction input for icon determination so that an erroneous action can be prevented.

Note that the image determination section 72 is a function of determining what the eyes of the user look at based on a picked-up image, and may be configured with processors such as a microprocessor and a CPU, or a combination of sequencers, that operate in accordance with pre-programmed software. The image determination section 72 may be configured with a dedicated circuit, or a combination of multiple general circuits, or may be configured as an ASIC by integrating the dedicated circuit or the general circuits, and the control section 71. Further, a design can also be made such that part or all of control performed by the image determination section 72 is undertaken by an external apparatus. In such a case, a wired or wireless communication circuit is interposed. Here, although the communication section C1 is not specifically described for simplicity, an embodiment is also conceivable in which characteristic processing of the present application and auxiliary processing are performed by external equipment such as a server and a personal computer. That is, the present application also covers such cases where the characteristics of the present invention are accomplished by a plurality of equipment in cooperation. For communication in such cases, Bluetooth (registered trademark), Wi-Fi (registered trademark), a telephone circuit, and the like are used. Although communication in such cases can be performed through a USB or the like, here, a microcomputer performs determination through specific sequences and arithmetic operations.

Since the image determination section 72 serves as a substitute for the eyes of the user, the image determination section 72 offers an advantage that a state of work the user is just being engaged in, in particular, movements of the hands and the like, can be determined in real time in an image pickup direction from the eyes of the user. That is, the image determination section 72 can determine a degree of concentration of the user on work in hand, or a subject itself the user is checking, based on a change in the image, or based on a location in the image of a specific characteristic object, such as the finger H of the user or a tool, a part, a material, a medicinal solution, or the like the user is using, or if another operator is attending, a finger, a tool, a part, a material, a medicinal solution, or the like held out, or alternatively based on a characteristic color or pattern, or a movement, of the subject. For example, the finger H of the user comes in a picked-up image on the wearable terminal 2 from a lower part of the picked-up image as an image having a pattern, a color, and/or movements with specific characters, while the finger of the other operator comes in and out in a different direction as an image having a characteristic pattern, a characteristic color, and/or characteristic movements. Since an image that is optimum for analysis of the work in hand can be obtained by the image pickup portion 11, the image determination section 72 can also determine whether the user rests the hands from the work or is moving the hands in concentration on the work.

Note that if it is possible to detect a shape of a hand, the user can make an effort to bring a hand or a finger to a location where the hand or the finger can be clearly determined if a display is designed to appear when the shape of the hand is detected.

FIGS. 8 to 14 are explanatory diagrams for explaining examples of composition of a display image on the wearable terminal 2 of the work assistance apparatus 1, according to the first embodiment of the present invention.

The display control section 73 performs various types of processing related to display. The display control section 73 can be configured with, for example, a video controller or a display controller. The display control section 73 may be configured separately from the control section 71. For example, the display control section 73 can display various kinds of menu displays or information received via the communication section C1 on the display portion 41.

The display control section 73 also controls a display image displayed on the display portion 41, based on a determination result inputted from the image determination section 72. The display control section 73 disposes the icons Ic, an application name An, and an indicator In in the display image.

The display control section 73 generates the display image, in response to an instruction input from the user, by disposing the plurality of icons Ic on a picked-up image as if the icons Ic three-dimensionally circulate along an inclined elliptical orbit from front to back, or from back to front. Hereinafter, "icon Ic" will refer to part or all of the icons Ic on a display image.

More specifically, the plurality of icons Ic are arranged in a predetermined order from an upper center of the display image to a lower left of the display image along an arcuate orbit. Each of the plurality of icons Ic is transparently presented. An icon Ic disposed at a middle left part is a selected-state icon If and presented at a forefront in a larger size than the other icons Ic. The other icons Ic than the selected-state icon If are presented in such a manner that an icon Ic farther from the selected-state icon If is smaller, paler, more transparent, and more blurred and is disposed at a further back. When the user makes an instruction input for icon movement, the plurality of arranged icons Ic move along the arcuate orbit in either the first direction D1 or the second direction D2 depending on the instruction input, and an icon Ic newly disposed at the middle left part becomes the selected-state icon If. For example, the first direction D1 is a direction traveling from an upper part of the display image toward a lower part of the display image along the arcuate orbit. The second direction D2 is a direction traveling from the lower part of the display image toward the upper part of the display image along the arcuate orbit.

For the application name An, a name of an application associated with the selected-state icon If is disposed.

The indicator In indicates a location of the selected-state icon If among the plurality of icons Ic. The indicator In has a long thin pattern Tn and a marker Mk. The long thin pattern Tn runs from a lower right part of the display image to an upper right part of the display image. The marker Mk is disposed on the long thin pattern Tn and changes depending on a type of the selected-state icon If.

For example, FIGS. 8 to 14 show examples in which seven icons Ic are displayed in a circulated manner. In FIGS. 8 to 14, the application name An is represented by "xxx".

Figure 9:
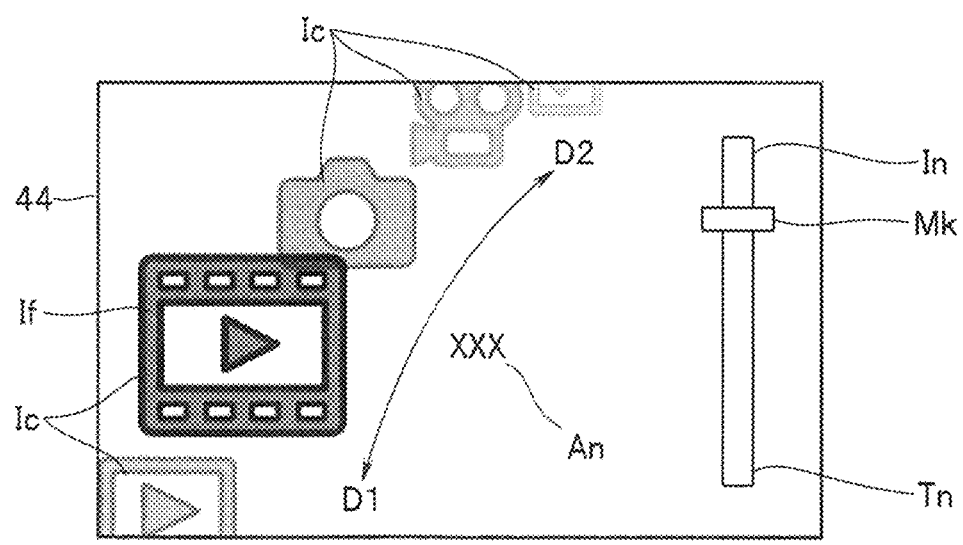
FIG. 9 is an explanatory diagram for explaining an example of composition of the display image on the wearable terminal of the work assistance apparatus, according to the first embodiment of the present invention.
Figure 10:
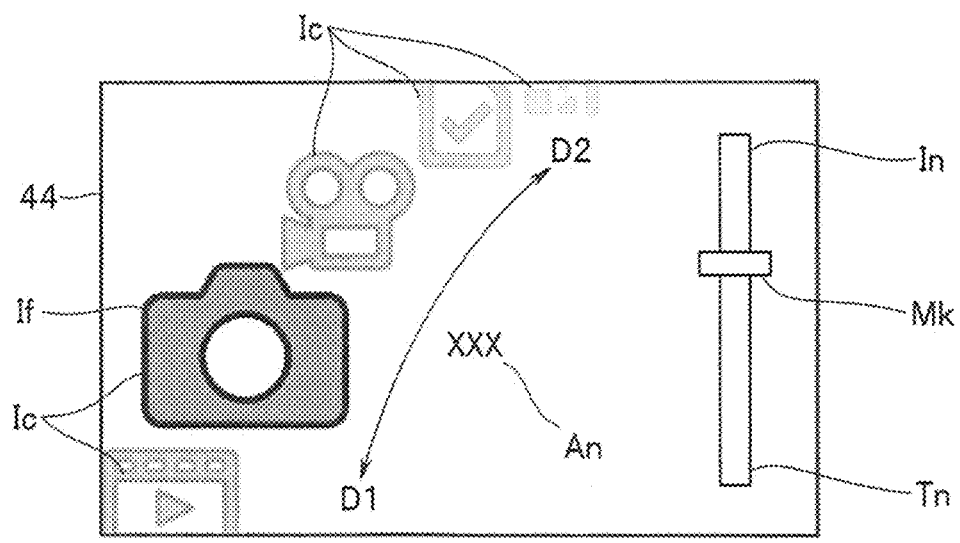
FIG. 10 is an explanatory diagram for explaining an example of composition of the display image on the wearable terminal of the work assistance apparatus, according to the first embodiment of the present invention.
Figure 11:
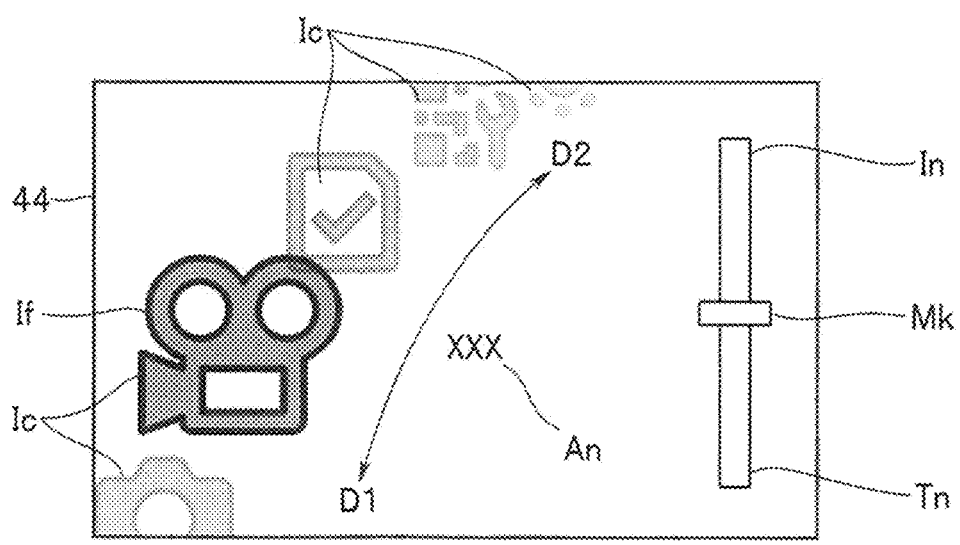
FIG. 11 is an explanatory diagram for explaining an example of composition of the display image on the wearable terminal of the work assistance apparatus, according to the first embodiment of the present invention.
Figure 12:
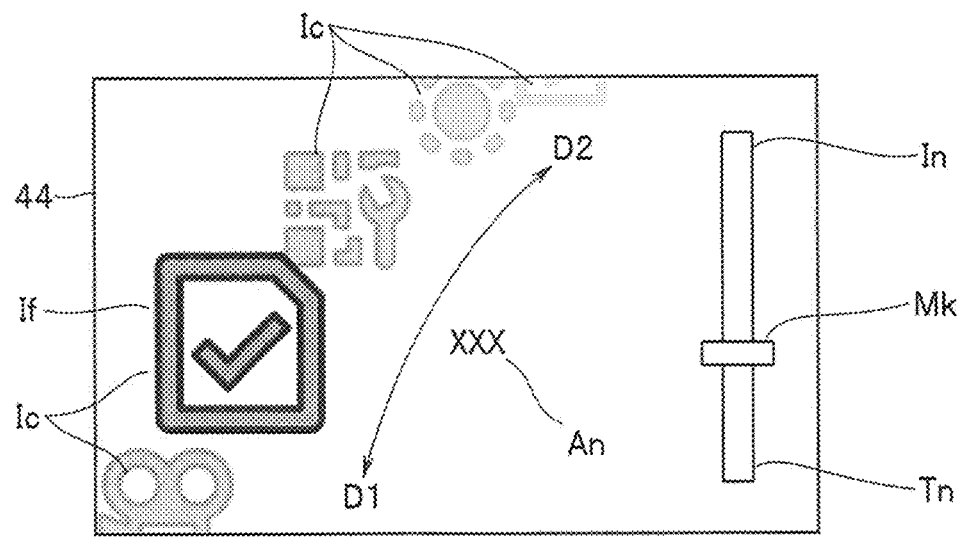
FIG. 12 is an explanatory diagram for explaining an example of composition of the display image on the wearable terminal of the work assistance apparatus, according to the first embodiment of the present invention.
Figure 13:
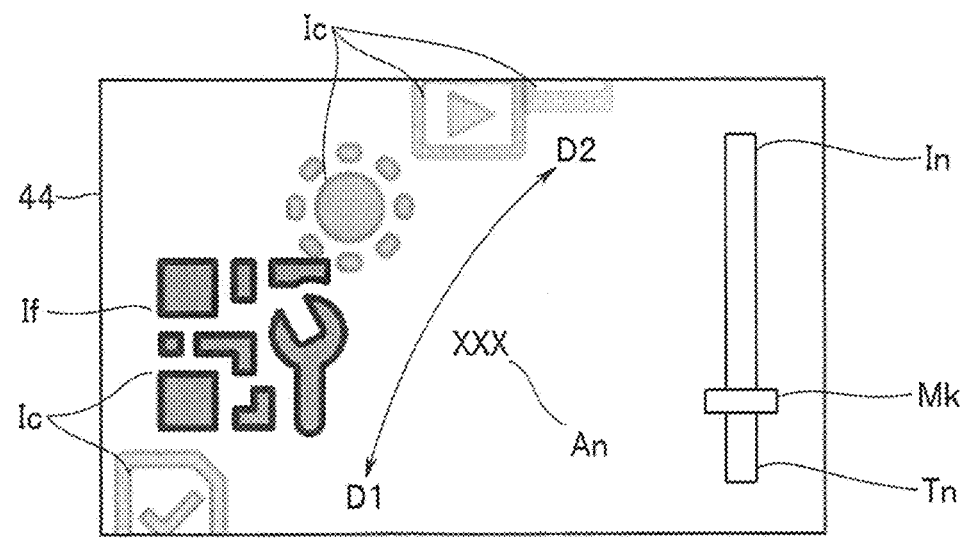
FIG. 13 is an explanatory diagram for explaining an example of composition of the display image on the wearable terminal of the work assistance apparatus, according to the first embodiment of the present invention.
Figure 14:
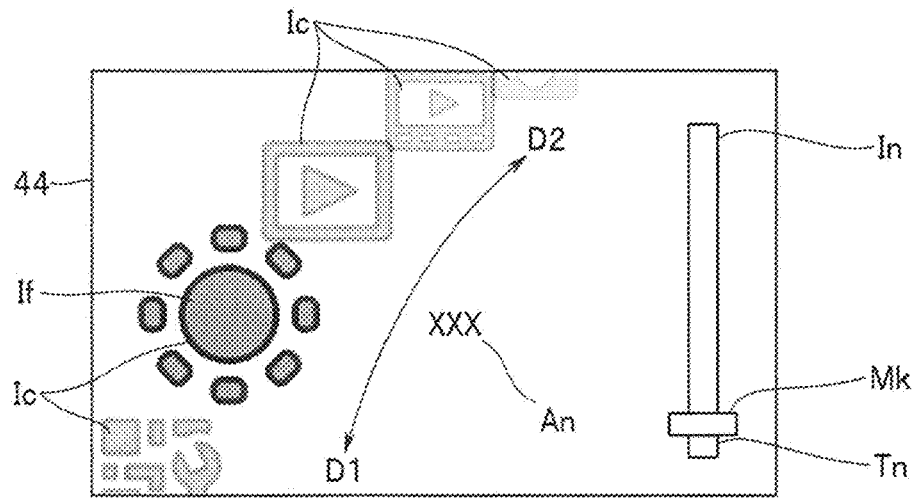
FIG. 14 is an explanatory diagram for explaining an example of composition of the display image on the wearable terminal of the work assistance apparatus, according to the first embodiment of the present invention.

FIG. 8 shows an example in which an icon Ic for activating a voice reproduction function is made to be the selected-state icon If. The marker Mk is disposed at an upper part of the long thin pattern Tn. When the user makes an instruction input for icon movement in the first direction D1, the icons Ic circulate in the first direction D1 as shown in FIG. 9, and an icon Ic for activating a picture reproduction function becomes the selected-state icon If. When the icons Ic circulate, the application name An and a location of the marker Mk change. When the user further makes instruction inputs for icon movement in the first direction D1, the selected-state icon If, the application name An, and the indicator In sequentially change to an icon Ic, an application name An, and an indicator Ic for activating a still image recording function (FIG. 10), a movie recording function (FIG. 11), a reminder function (FIG. 12), a setting input function (FIG. 13), and a brightness adjustment function (FIG. 14), which are displayed in a circulated manner.

When the user makes an instruction input for icon movement in the second direction D2, the icons Ic sequentially move in the second direction D2. When the icons Ic move, the application name An and the indicator In sequentially change.

Note that the icons Ic in FIGS. 8 to 14 are shown as examples and are not intended to limit applications associated with icons Ic, designs and patterns, order, and the number of icons Ic.

Note that the display control section 73 may be configured to select and display various types of information read from the recording section 61, based on an operation of the operation portion 31 by the user, and also may be configured to automatically determine a timing of change depending on a determination by the image determination section 72 about a progress of work and display various types of information on the display portion 41.

The display control section 73 may be configured to create a process step evidence and to create a final evidence, for which the display control section 73 records inspection result information in the recording section 61, each time work in each process step is completed and each time work in all process steps is completed, respectively, based on a determination result made by the image determination section 72 on a progress of the work, or on an operation by the user.

That is, the work assistance apparatus 1 includes the display portion 41, the image pickup portion 11, and the control section 71. The display portion 41 forms the virtual display area Vd within the field of view of the user. The image pickup portion 11 picks up an image in front of the user and outputs a picked-up image. When the finger H of the user alternately moves in the frontward direction F and the backward direction B of the user within the picked-up image, the control section 71 moves the display components for operation within a display image in the virtual display area Vd. When the finger H moves in the sideward direction S of the user within the picked-up image, the control section 71 activates processing associated with a determined one of the display components for operation.

More specifically, the control section 71 includes the image determination section 72 and the display control section 73. When the image determination section 72 detects the finger H based on the picked-up image and determines that the finger H alternately moves in the frontward direction F and the backward direction B of the user, the image determination section 72 outputs to the display control section 73 a determination result indicating that an instruction input for display-component-for-operation movement is made. When the image determination section 72 detects the finger H based on the picked-up image and determines that the finger H moves in the sideward direction S of the user, the image determination section 72 outputs to the display control section 73 a determination result indicating that an instruction input for display-component-for-operation determination is made.

When an instruction input is made by an operation of touching and sliding the operation portion 31 in either the frontward direction F or the backward direction B with the finger H, the operation portion 31 outputs to the control section 71 a control signal indicating that an instruction input for display-component-for-operation movement is made. When an instruction input is made by an operation of tapping the operation portion 31, the operation portion 31 outputs to the control section 71 a control signal indicating that an instruction input for display-component-for-operation determination is made.

When the display control section 73 receives from the image determination section 72 an input of the determination result indicating that an instruction input for display-component-for-operation movement is made, the display control section 73 moves the display components for operation within the display image. Alternatively, the control section 71 moves the display components for operation within the display image in response to the control signal. When the display control section 73 receives from the image determination section 72 an input of the determination result indicating that an instruction input for display-component-for-operation determination is made, the display control section 73 activates processing associated with a determined one of the display components for operation. Alternatively, the control section 71 activates processing associated with a determined one of the display components for operation in response to the control signal.

The icons Ic are displayed in a circulated manner in a direction depending on a movement of the finger H. More specifically, the icons Ic are displayed in a circulated manner along an inclined elliptical orbit.

The display portion 41 and the image pickup portion 11 are attached to the head of the user through the mounting portion 2b.

A work assistance program causes a computer to execute a code for the display portion 41 configured to form the virtual display area Vd within the field of view of the user, a code for the image pickup portion 11 configured to pick up an image in front of the user and output a picked-up image, and a code for the control section 71 configured to move the display components for operation within a display image in the virtual display area Vd when the finger H of the user alternately moves in the frontward direction F and the backward direction B of the user within the picked-up image.

Configuration of the Work Determination Apparatus 3

Referring back to FIG. 1, the work determination apparatus 3 will be described.

The work determination apparatus 3 is, for example, a server. The work determination apparatus 3 includes a communication section C2, a recording section 81, and a control section 91.

The communication section C2 is a circuit configured to perform communication with the communication section C1 of the wearable terminal 2 under control of the control section 91.

The recording section 81 includes a memory device such as a readable and writable flash ROM or an HDD. The recording section 81 includes a work-specific database 82 and an evidence recording section 83, in addition to programs for various processing sections that control individual sections included in the work determination apparatus 3.

In the work-specific database 82, work procedure information, which is information on a procedure related to predetermined work, is stored. The work-specific database 82 may have a structure similar to the structure of the work-specific database 62. In FIG. 1, respective work procedure information on work A, work B, work C, and work D is recorded in the work-specific database 82.

In the evidence recording section 83, inspection result information on each work or each process step is recorded as an evidence.

The control section 91 controls an action of each section included in the work determination apparatus 3. The control section 91 includes a processor such as a CPU. Functions of the control section 91 are implemented by reading and executing the programs for the various processing sections recorded in the recording section 81. The control section 91 can execute the processing sections for a subject determination section 92, a work determination section 93, a guide section 94, a display control section 95, and a size determination section 96. Information outputted from each of the work determination section 93, the subject determination section 92, and the size determination section 96 is recorded in the evidence recording section 83 as an evidence in accordance with a predetermined condition.

The subject determination section 92 determines and identifies a subject based on a picked-up image inputted from the wearable terminal 2, and enhances analysis suitable for a subject of work. For example, the subject determination section 92 can determine a pattern of the finger H of the user and a pattern of a background, or a specific subject such as an object held by the finger H and a position of the specific subject within the work. By determining the subject of work, determination compared with a work reference can be made, such as counting how many seconds has passed since a part was held, or detecting that a wrong tool is taken. The determination may be simplified, as a matter of course, such that it is only determined where the finger H is located and how the finger H moves, on a work basis or on a work process step basis. A progress of the work can be determined, from a time period passed since a starting time of the work during a process step of the work, a time period passed since a display for the work was started, or comparison with a standard work time period. Moreover, the subject determination section 92 can also determine and identify a damage state of the subject, such as a scratch and a crack.

The work determination section 93 performs image analysis based on the picked-up image received from the wearable terminal 2, and determines a progress of the work. For example, based on a picked-up image inputted from the image pickup portion 11, the work determination section 93 calculates a degree of similarity to a predetermined reference image recorded in the work-specific database 82 and can determine that the work up to a predetermined stage is completed when the degree of similarity is larger than a predetermined threshold value and when the picked-up image is similar to the predetermined reference image.

The guide section 94 outputs a guide message according to the progress of the work of the user. For example, the guide section 94 reads the work procedure information recorded in the work-specific database 82 and, based on an image analysis result inputted from the image determination section 72, outputs a guide message that guides a course of the work to the wearable terminal 2. When the guide section 94 receives an inquiry from the wearable terminal 2, the guide section 94 also outputs a guide message according to the progress of the work to the display control section 95.

The display control section 95 executes various types of processing related to display. The display control section 95 outputs the guide message outputted from the guide section 94 to the wearable terminal 2 so that the guide message is displayed on the display portion 41.

The size determination section 96 determines a size of the subject, based on the picked-up image inputted from the wearable terminal 2. For example, when the subject is identified by the subject determination section 92, the size determination section 96 determines a size of the subject and converts the size into numeric form. When damage of the subject is determined by the subject determination section 92, the size determination section 96 also determines a size of the damage and converts the size into numeric form.

Operation

In the work assistance apparatus 1, only the wearable terminal 2 can be operated, or with a user dispatched at a work site, the wearable terminal 2 can be operated while a remote operator instructs the user at the work site. A role of the remote operator can also be played by the work determination apparatus 3.

First, instruction input determination processing performed by the wearable terminal 2 will be described.

Figure 15:
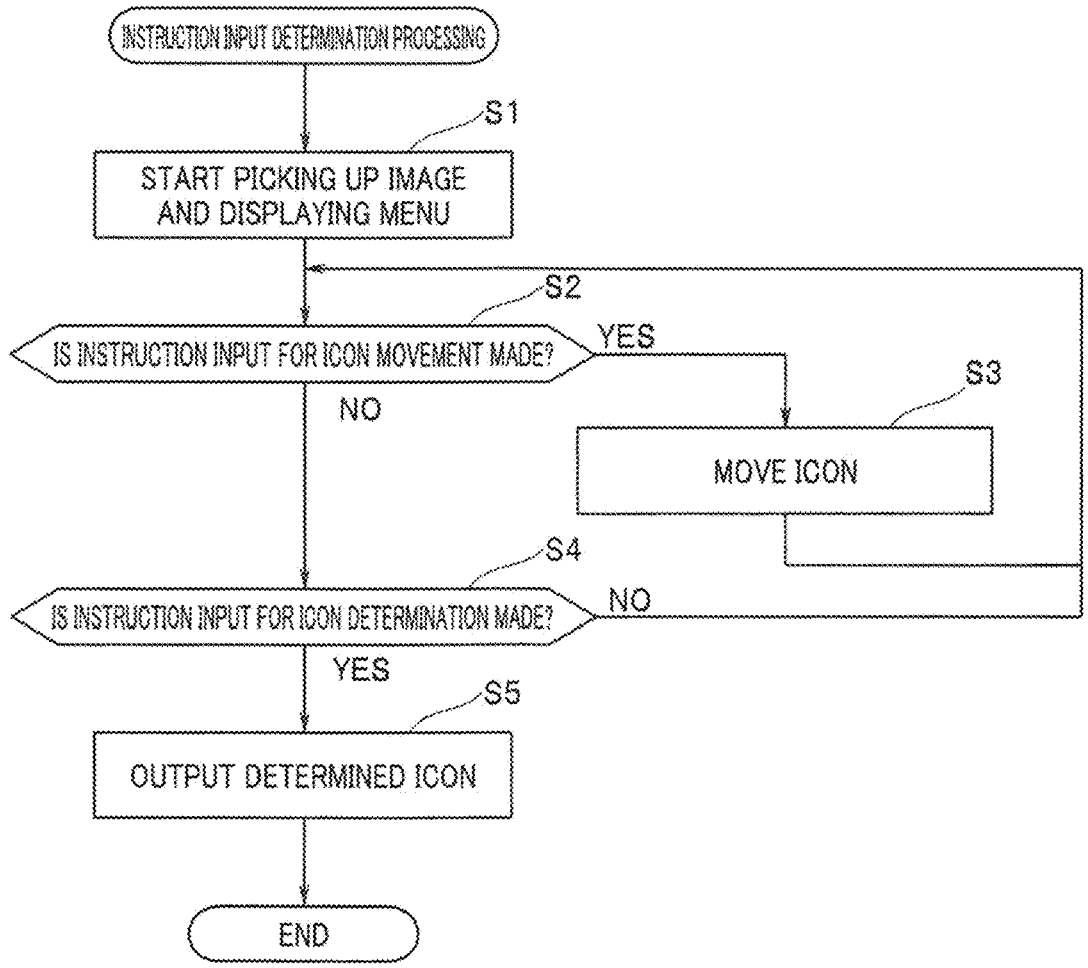
FIG. 15 is a flowchart for explaining an example of a flow of instruction input determination processing performed by the wearable terminal of the work assistance apparatus, according to the first embodiment of the present invention.

FIG. 15 is a flowchart for explaining an example of a flow of the instruction input determination processing performed by the wearable terminal 2 of the work assistance apparatus 1, according to the first embodiment of the present invention.

The instruction input determination processing can be called up from work assistance processing, which will be described later.

Picking up an image and displaying a menu are started (S1). The control section 71 activates the image pickup portion 11 and obtains a picked-up image from the image pickup portion 11. The control section 71 disposes the icons Ic, the application name An, and the indicator In on a display image through processing performed by the display control section 73, and starts displaying a menu.

It is determined whether or not an instruction input for icon movement is made (S2). The control section 71 determines whether or not an instruction input for icon movement is made, through processing performed by the image determination section 72. Alternatively, the control section 71 determines whether or not an instruction input for icon movement is made, based on a control signal inputted from the operation portion 31. When an instruction input for icon movement is made (S2: YES), processing goes to S3. When an instruction input for icon movement is not made (S2: NO), processing goes to S4.

The icons Ic are moved (S3). The control sections 71 and 91 circulate the icons Ic in either the first direction D1 or the second direction D2 depending on the instruction input, through processing performed by the display control section 73. After the icons Ic are circulated, processing goes back to S2.

It is determined whether or not an instruction input for icon determination is made (S4). The control section 71 determines whether or not an instruction input for icon determination is made, through processing performed by the image determination section 72. Alternatively, the control sections 71 and 91 determine whether or not an instruction input for icon determination is made, based on a control signal inputted from the operation portion 31. When an instruction input for icon determination is made (S4: YES), processing goes to S5. When an instruction input for icon determination is not made (S4: NO), processing goes back to S2.

A determined one of the icons Ic is outputted (S5). The control section 71 outputs the determined icon Ic to the source processing. For example, when the instruction input determination processing is called up from the work assistance processing, the determined icon Ic is outputted to the work assistance processing.

Subsequently, the work assistance processing performed by the wearable terminal 2 will be described.

Figure 16:
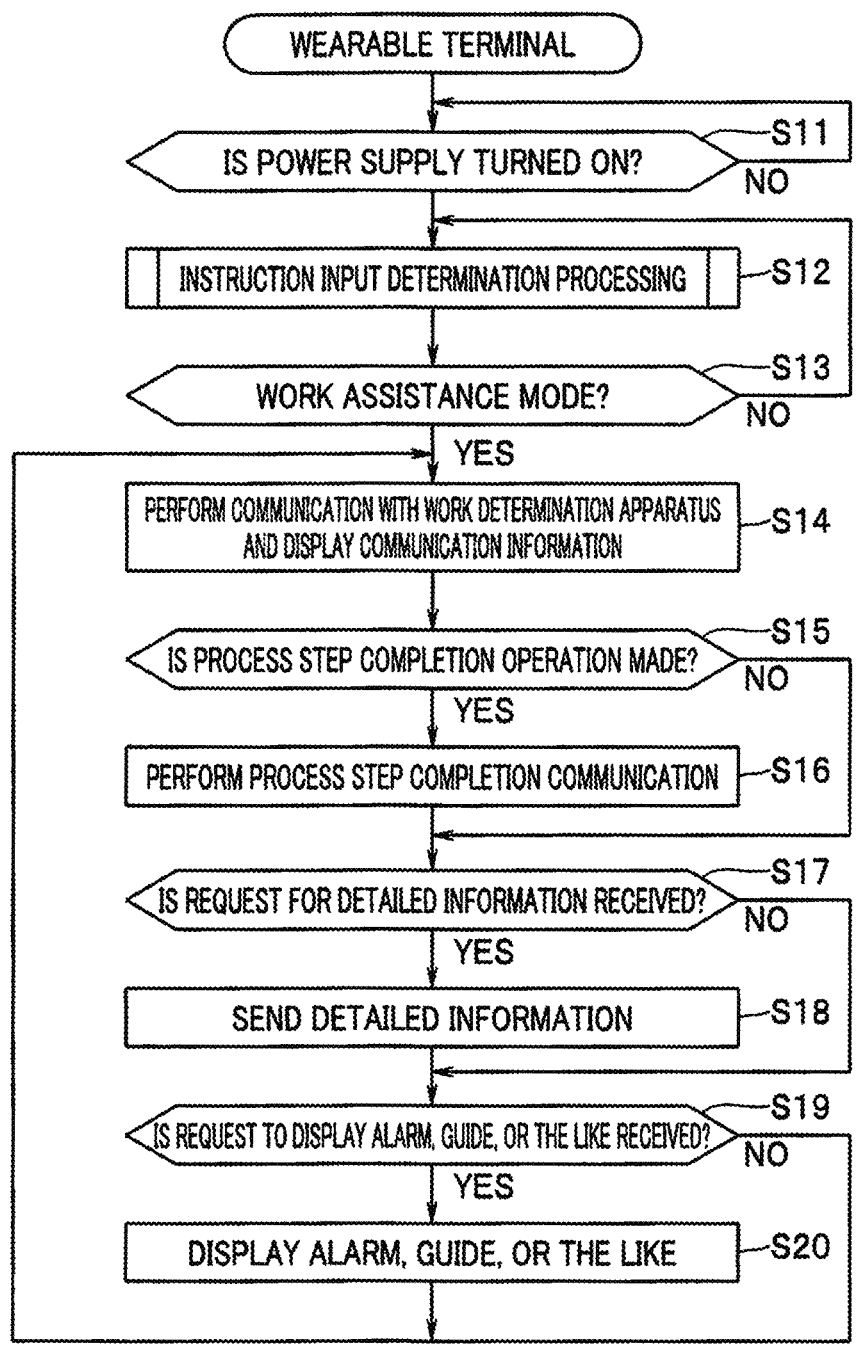
FIG. 16 is a flowchart for explaining an example of a flow of work assistance processing performed by the wearable terminal of the work assistance apparatus, according to the first embodiment of the present invention.

FIG. 16 is a flowchart for explaining an example of a flow of the work assistance processing performed by the wearable terminal 2 of the work assistance apparatus 1, according to the first embodiment of the present invention.

The user wears the wearable terminal 2 on the head and starts work.

A wait is performed until a power supply is turned on (S11). The wearable terminal 2 waits until a power supply of the wearable terminal 2 is turned on.

The instruction input determination processing is performed (S12). The control section 71 performs the instruction input determination processing. The user makes an instruction input for icon movement by moving the finger H in front of the camera 12 or operating the operation portion 31 to circulate the icons Ic displayed on the display portion 41 so that a desired icon Ic is made to be the selected-state icon If. Subsequently, the user makes an instruction input for icon determination and determines the desired icon Ic.

It is determined whether or not an instruction input for work assistance mode is made (S13). The control section 71 determines whether or not the icon Ic determined in S12 is an icon that instructs to activate a work assistance mode. When an instruction input for work assistance mode is made (S13: YES), processing goes to S14. When an instruction input for work assistance mode is not made (S13: NO), processing goes back to S12. Note that, for example, when an instruction input to activate an application other than the work assistance mode, such as a call application, is made, the instruction input determination processing may be terminated and the application indicated by the instruction input may be activated.

Communication with the work determination apparatus 3 is performed and communication information is displayed (S14). The control section 71 sends a picked-up image to the work determination apparatus 3 via the communication section C1. The work determination apparatus 3 analyzes the picked-up image and sends a guide message according to a progress of the work to the wearable terminal 2. The control section 71 displays the guide message received from the work determination apparatus 3 on the display portion 41.

It is determined whether or not a process step completion operation is made (S15). The control section 71 determines whether or not a predetermined process step completion operation is made by the user. When a predetermined process step completion operation is made (S15: YES), processing goes to S16. When a predetermined process step completion operation is not made (S15: NO), processing goes to S17. Note that in the processing in S15, an icon Ic indicating completion of a process step may be displayed on the display portion 41 through the instruction input determination processing, to cause the user to make an instruction input.

Process step completion communication is performed (S16). The control section 71 performs process step completion communication with the work determination apparatus 3 and thereby terminates the work assistance processing.

It is determined whether or not a request for detailed information is received (S17). The control section 71 determines whether or not a request for detailed information is received from the work determination apparatus 3. When a request for detailed information is received from the work determination apparatus 3 (S17: YES), processing goes to S18. When a request for detailed information is not received from the work determination apparatus 3 (S17: NO), processing goes to S19.

The detailed information is sent (S18). The control section 71 displays a message urging the user to pick up an enlarged image on the display portion 41. The user picks up an enlarged image with the image pickup portion 11. When the picked-up image inputted from image pickup portion 11 is analyzed and it is determined that an enlarged image is inputted through processing performed by the image determination section 72, the control section 71 sends the enlarged image to the work determination apparatus 3.

It is determined whether or not a request to display an alarm, a guide, or the like is received (S19). The control section 71 determines whether or not a request to display an alarm message or a guide message is received from the work determination apparatus 3. When such a display request is received from the work determination apparatus 3 (S19: YES), processing goes to S20. When such a display request is not received from the work determination apparatus 3, processing goes back to S14.

The alarm, the guide, or the like is displayed (S20). The control section 71 displays the alarm message or the guide message on the display portion 41 in response to the request to display an alarm, a guide, or the like received in S19.

Subsequently, the work assistance processing performed by the work determination apparatus 3 will be described.

Figure 17:
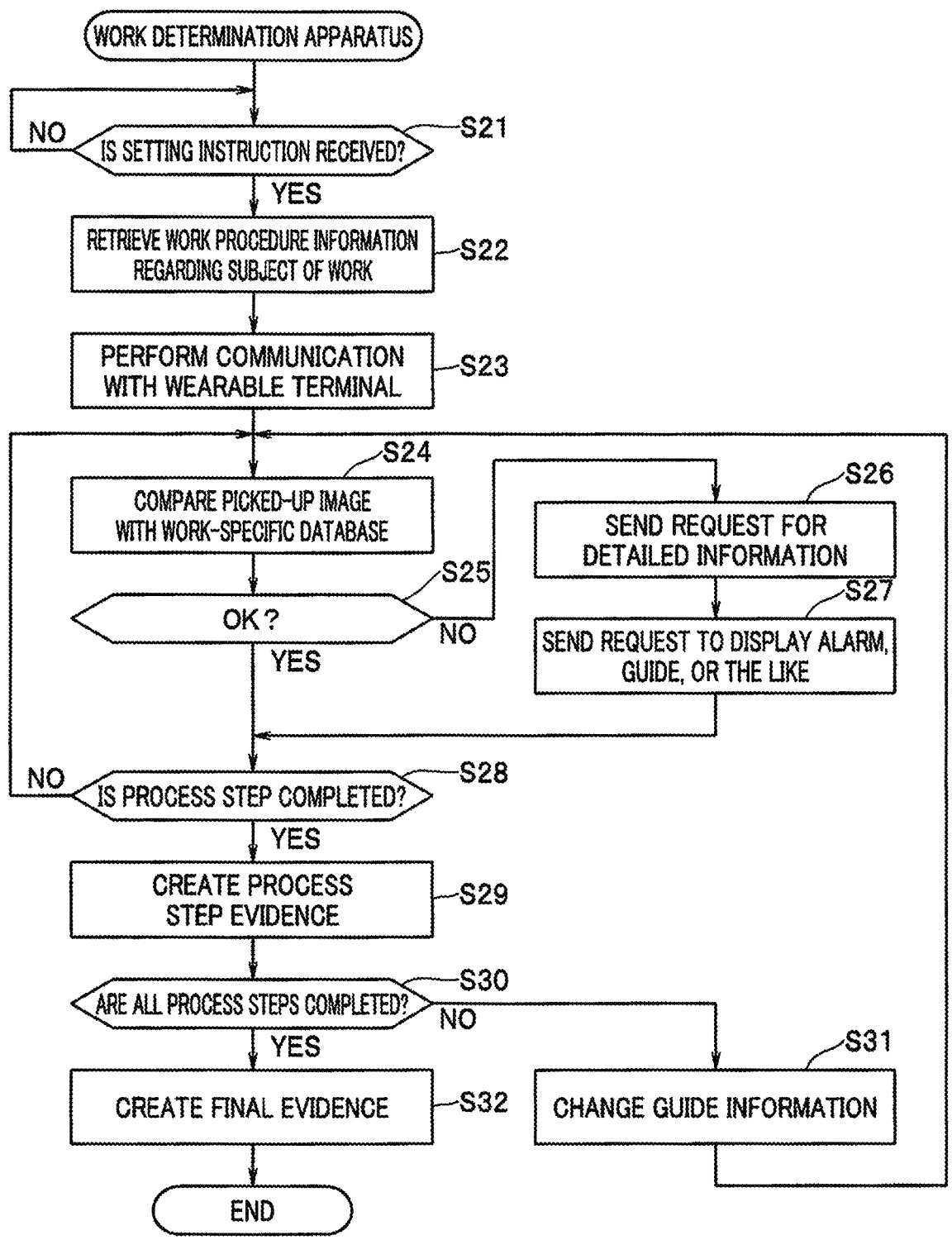
FIG. 17 is a flowchart for explaining an example of a flow of the work assistance processing performed by a work determination apparatus of the work assistance apparatus, according to the first embodiment of the present invention.

FIG. 17 is a flowchart for explaining an example of a flow of the work assistance processing performed by the work determination apparatus 3 of the work assistance apparatus 1, according to the first embodiment of the present invention.

It is determined whether or not a setting instruction is received (S21). The control section 91 determines whether or not a setting instruction is received from the wearable terminal 2 via the communication section C2. When a setting instruction is received, processing goes to S22. The processing in S21 is repeated until a setting instruction is received.

Work procedure information on a subject of work is retrieved (S22). The control section 91 retrieves work procedure information corresponding to the setting instruction received in S21 from the work-specific database 82.

Communication is performed with the wearable terminal 2 (S23). The control section 91 communicates with the wearable terminal 2 and sends a result of retrieving the work procedure information to the wearable terminal 2.

A picked-up image is compared with the work-specific database 82 (S24). When a picked-up image is received from the wearable terminal 2, the control section 91 determines and identifies a subject through processing performed by the subject determination section 92. The control section 91 compares the subject in the picked-up image with a predetermined reference image included in the work procedure information retrieved from the work-specific database 82 and determines a progress of the work, through processing performed by the work determination section 93.

It is determined whether or not a determination result indicates any abnormality (S25). The control section 91 determines whether or not the determination result in S24 indicates any abnormality. When the determination result indicates an abnormality (S25: NO), processing goes to S26. When the determination result indicates no abnormality (S25: YES), processing goes to S28.

A request for detailed information is sent (S26). When it is determined that more detailed information such as an enlarged image is required for the processing in S24 and S25, the control section 91 sends a request for detailed information to the wearable terminal 2.

A request to display an alarm, a guide, or the like is sent (S27). When it is determined to cause the wearable terminal 2 to display an alarm, a guide message, or the like, the control section 91 sends a message according to a progress of the work of the user to the wearable terminal 2, through processing performed by the guide section 94.

It is determined whether or not a process step is completed (S28). The control section 91 determines whether or not a process step is completed. When the process step is completed (S28: YES), processing goes to S29. When the process step is not completed (S28: NO), processing goes back to S24. Note that the control section 91 may terminate a process step based on an operation of the operation portion 31 by the user. A process step may also be terminated based on a speech of the user into the microphone 21 indicating to terminate the process step, such as "Terminate the process step".

A process step evidence is created (S29). The control section 91 records inspection result information on a predetermined process step into the evidence recording section 83.

It is determined whether or not all process steps are completed (S30). The control section 91 determines whether or not all process steps in the predetermined work are completed. When not all process steps are completed (S30: NO), processing goes to S31. When all process steps are completed (S30: YES), processing goes to S32.

Guide information is changed (S31). The control section 91 changes guide information through processing performed by the guide section 94 and outputs the changed guide information to the wearable terminal 2.

A final evidence is created (S32). The control section 91 records inspection result information on all the process steps as a whole into the evidence recording section 83.

Figure 18:
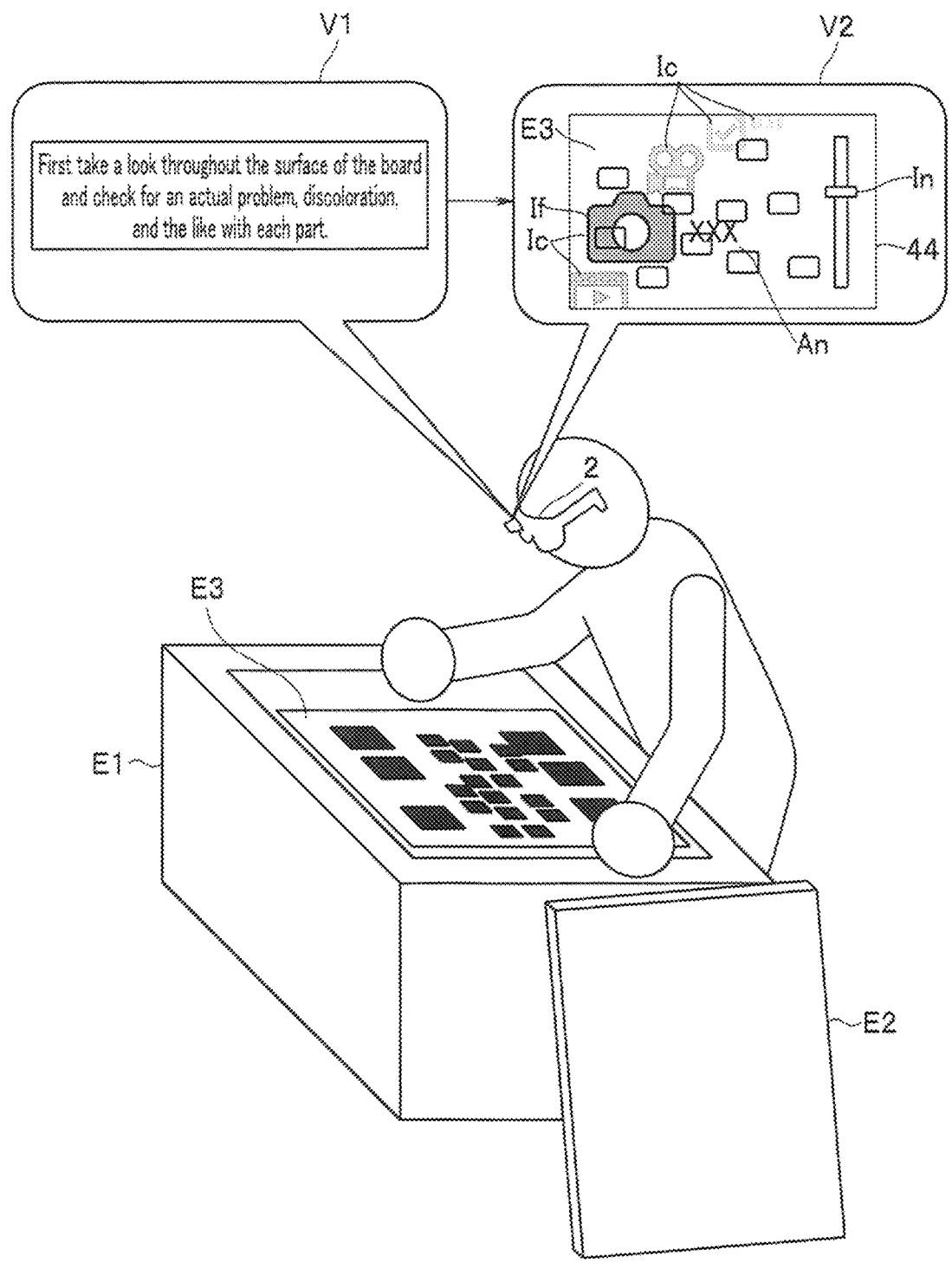
FIG. 18 is an explanatory diagram for explaining a state of use of the work assistance apparatus, according to the first embodiment of the present invention.

FIG. 18 is an explanatory diagram for explaining a state of use of the work assistance apparatus 1 according to the first embodiment of the present invention.

FIG. 18 illustrates an example of inspection work on an electronic device E1. FIG. 18 shows a state in which a cover E2 of the electronic device E1 is removed and an internal circuit board E3 is exposed to an external environment.

The user wears the wearable terminal 2 on the head and turns on the power supply (S11). The wearable terminal 2 performs the instruction input determination processing (S12). When an instruction input for work assistance mode is made (S13), the wearable terminal 2 communicates with the work determination apparatus 3 and sends a setting instruction and a picked-up image to the work determination apparatus 3 (S14). When the work determination apparatus 3 receives the setting instruction (S21), the work determination apparatus 3 retrieves work procedure information on a subject of work from the work-specific database 82 (S22), and receives the picked-up image (S23). The work determination apparatus 3 determines a progress of the work based on the picked-up image (S24, S25), and sends to the wearable terminal 2 a guide message according to the progress of the work, for example, "First take a look throughout the surface of the board and check for an actual problem, discoloration, and the like with each part" (S27). The wearable terminal 2 displays the guide message received from the work determination apparatus 3 on the display portion 41 (S14 to S20; V1 in FIG. 18). While the user picks up an image of the electronic device E1 with the image pickup portion 11, the user proceeds with the inspection work on the electronic device E1 in accordance with the guide message. The image picked up by the image pickup portion 11 and the icons Ic are displayed on the display portion 41. The user moves the icons Ic by moving the finger H frontward and backward in front of the camera 12, determines one of the icons Ic by moving the finger H sideward, and activates, for example, an application for shooting a still image (V2 in FIG. 18). The processing in S14 to 20 is repeated, and when a process step completion operation is made (S15), the wearable terminal 2 performs process step completion communication (S16). When the work determination apparatus 3 receives the process step completion communication, the work determination apparatus 3 determines that a process step is completed (S28), and creates a process step evidence (S29). The processing in S24 to S30 at the work determination apparatus 3 is performed until all process steps are completed (S30). When all the process steps are completed, the work determination apparatus 3 creates a final evidence (S32), whereby the work assistance processing is terminated.

That is, the work assistance apparatus 1 includes the head-mounted display apparatus and the work determination apparatus 3, wherein the head-mounted display apparatus and the work determination apparatus 3 are connected to each other through communication via a network, the head-mounted display apparatus includes the display portion 41, the image pickup portion 11, and the control section 71 and sends a picked-up image to the work determination apparatus 3, and the work determination apparatus 3, based on the received picked-up image, sends a guide message to the head-mounted display apparatus so that the guide message is displayed on the display portion 41.

Moreover, in a work assistance method, the virtual display area Vd is formed in the field of view of the user by the display portion 41; an image in front of the user is picked up and the picked-up image is outputted by the image pickup portion 11; and when the finger H of the user alternately moves in the frontward direction F and the backward direction B of the user within the picked-up image, the display components for operation within in a display image in the virtual display area Vd are moved by the control section 71.

Thus, in the wearable terminal 2, the icons Ic are displayed as if the icons Ic circulate from front to back, or from back to front, depending on an action of the finger H in the frontward direction F and the backward direction B, and therefore an operation method is easy to understand from the movement of the icons Ic.

Moreover, in the wearable terminal 2, the icons Ic can be displayed in a circulated manner by an operation of moving the finger H in the frontward direction F and the backward direction B either in an air away from the wearable terminal 2 or on the operation portion 31, and the selected-state icon If can be determined by an operation of moving the finger H in the sideward direction S. Accordingly, in the wearable terminal 2, an operation method in the air is easily understood from an operation method on the operation portion 31. That is, since a movement of so-to-speak real and physical operation means serves as a model virtual operation in some way, an advantage is brought about that it is easier for the user to learn an operational technique by applying operations the user can perform on the operation portion 31 to a situation in which the operations are also possible without an actual touch or slide. Accordingly, if real operations are designed in other forms or customized, virtual operations had better be changed accordingly. Real operations and virtual operations may be designed differently for a reason that the real operations and the virtual operations are performed in different scenarios, as a matter of course.

According to the first embodiment, the work assistance apparatus 1, through the wearable terminal 2, makes it possible to intuitionally operate the icons Ic according to an action of the finger H, regardless of a display location where the icons Ic are virtually displayed, and to make an instruction input more easily without fail.

Modification 1 of First Embodiment

In the first embodiment, a description is given of an example in which the work assistance apparatus 1 performs work assistance for inspection work or the like. However, the work assistance apparatus 1 can also perform work assistance by solving a trouble.

Figure 19:
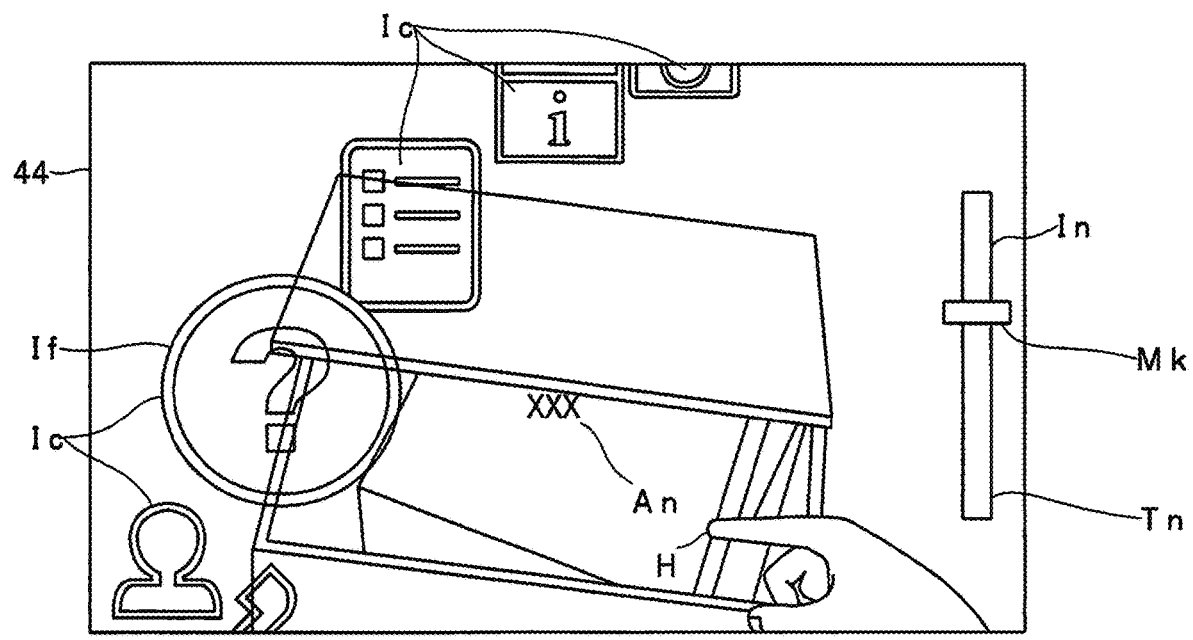
FIG. 19 is an explanatory diagram for explaining an example of composition of a display image on the wearable terminal of the work assistance apparatus, according to a modification 1 of the first embodiment of the present invention.

FIG. 19 is an explanatory diagram for explaining an example of composition of a display image on the wearable terminal 2 of the work assistance apparatus 1, according to a modification 1 of the first embodiment of the present invention. In the present modification, a description of same components as components of other embodiments and modifications will be omitted.

FIG. 19 illustrates an example of a display image on the display portion 41 in product inspection work.

The user wears the wearable terminal 2 on the head and turns the power supply on (S11). The wearable terminal 2 performs the instruction input determination processing (S12). When an instruction input for work assistance mode is made (S13), the wearable terminal 2 communicates with the work determination apparatus 3 and sends a setting instruction and a picked-up image to the work determination apparatus 3 (S14). When the work determination apparatus 3 receives the setting instruction (S21), the work determination apparatus 3 retrieves work procedure information on the product inspection operation from the work-specific database 82 (S22), and receives the picked-up image (S23).

The work determination apparatus 3 determines a progress of the work based on the picked-up image (S24, S25), and sends to the wearable terminal 2 a guide message according to the progress of the work, for example, "First check for damage to the contents" (S27). The wearable terminal 2 displays the guide message received from the work determination apparatus 3 on the display portion 41 (S14 to S20). While the user picks up an image of the contents with the image pickup portion 11, the user proceeds with the product inspection work in accordance with the guide message. The image picked up by the image pickup portion 11 and the icons Ic are displayed on the display portion 41. When it is determined that the contents have an abnormality, the work determination apparatus 3 sends an alarm message to the wearable terminal 2 so that the alarm message is displayed on the display portion 41 (S24 to S27, S20). As shown in FIG. 19, the user moves the icons Ic by moving the finger H frontward and backward, determines one of the icons Ic by moving the finger H sideward, and thereby activates, for example, a help function. When the help function is activated, the work determination apparatus 3 analyzes the picked-up image of the contents picked up by the image pickup portion 11 and has the display portion 41 display a guide message, through the processing in S24 to S27.

Thus, in the present modification, the work assistance apparatus 1, through the wearable terminal 2, makes it possible to perform work assistance by solving a trouble, to intuitionally operate the icons Ic regardless of a display location where the icons Ic are virtually displayed, and to make an instruction input more easily without fail.

Modification 2 of First Embodiment

In modification 1 of the first embodiment, the work assistance apparatus 1 performs work assistance by solving a trouble. However, work assistance can also be performed by displaying a list of contact persons.

Figure 20:
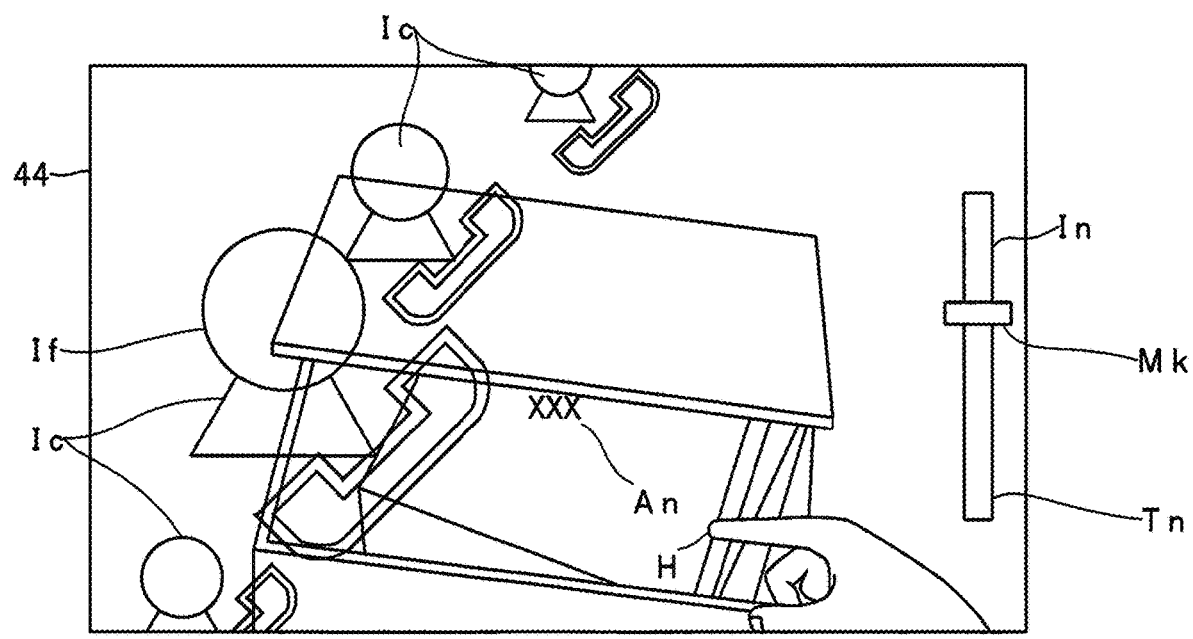
FIG. 20 is an explanatory diagram for explaining an example of composition of a display image on the wearable terminal of the work assistance apparatus, according to a modification 2 of the first embodiment of the present invention.

FIG. 20 is an explanatory diagram for explaining an example of composition of a display image on the wearable terminal 2 of the work assistance apparatus 1, according to a modification 2 of the first embodiment of the present invention. In the present modification, a description of same components as components of other embodiments and modifications will be omitted.

Each of the plurality of icons Ic shown in FIG. 20 includes a pattern of a face of a contact person combined with a phone receiver. Each icon Ic is created beforehand based on a face photograph of a contact person, or the like.

In the instruction input determination processing, when the user makes an instruction input for icon movement by moving the finger H in the frontward direction F or in the backward direction B in front of the camera 12, the faces of the contact persons are displayed in a circulated manner from front to back, or from back to front.

When the user makes an instruction input for icon determination by moving the finger H in the sideward direction S in front of the camera 12, one of the icons Ic is determined, and a call is made to a person in charge associated with the determined icon Ic.

Thus, the work assistance apparatus 1, through the wearable terminal 2, makes it possible to intuitionally operate the icons Ic regardless of a display location where the icons Ic are virtually displayed, to make an instruction input more easily without fail, and to make a contact with a person in charge associated with a determined icon Ic.

Modification 3 of First Embodiment

In modification 2 of the first embodiment, the work assistance apparatus 1 displays a list of contact persons.

However, the work assistance apparatus 1 may be configured to display a list of progresses of a plurality of works. In the present modification, a description of same components as components of other embodiments and modifications will be omitted.

In the present modification, each of the plurality of icons Ic represents a progress of each work proceeded in parallel, for example, a plurality of leak test works. Each progress of work may include a waiting time period for the work.

In the instruction input determination processing, when an instruction input for icon movement is made, the icons Ic are displayed in a circulated manner, and the user can visually recognize a progress of work associated with each icon Ic.

Thus, the work assistance apparatus 1, through the wearable terminal 2, makes it possible to intuitionally operate the icons Ic regardless of a display location where the icons Ic are virtually displayed, to make an instruction input more easily without fail, and to have the display portion 41 display a progress of work associated with each icon Ic.

Modification 4 of First Embodiment

The work assistance apparatus 1 may be configured to be able to output assistance information. In the present modification, a description of same components as components of other embodiments and modifications will be omitted.

In the present modification, for example, an icon Ic for outputting assistance information is provided.

In the instruction input determination processing, when the selected-state icon If for outputting assistance information is determined from among the icons Ic, the assistance information, for example, information on a patient to undergo surgery, a history of treatment, or information on latest treatment, is displayed on the display portion 41.

Thus, the work assistance apparatus 1, through the head-mounted display apparatus, makes it possible to intuitionally operate the icons Ic regardless of a display location where the icons Ic are virtually displayed, to make an instruction input more easily without fail, and to have the display portion 41 display assistance information associated with each icon Ic.

Modification 5 of First Embodiment

The work assistance apparatus 1 may be configured to be able to select a desired monitor from among a plurality of monitors. In the present modification, a description of same components as components of other embodiments and modifications will be omitted.

In the present modification, for example, display screens of a plurality monitors placed in an operating room or the like are sent to the work assistance apparatus 1. The plurality of icons Ic are associated with the plurality of monitors, respectively.

In the instruction input determination processing, when an instruction input for icon movement is made, the icons Ic are displayed in a circulated manner. When an instruction input for icon determination is made, a display screen of a monitor associated with the selected-state icon If is displayed on the display portion 41.

Thus, the work assistance apparatus 1, through the head-mounted display apparatus, makes it possible to intuitionally operate the icons Ic regardless of a display location where the icons Ic are virtually displayed, to make an instruction input more easily without fail, and to have the display portion 41 display a display screen of a monitor associated with each icon Ic.

Second Embodiment

In the first embodiment and the modifications of the first embodiment, the wearable terminal 2 is operated through an action of the finger H of the user. However, the wearable terminal 2 may be configured to be able to be operated through an action of the eyes of the user.

Figure 21:
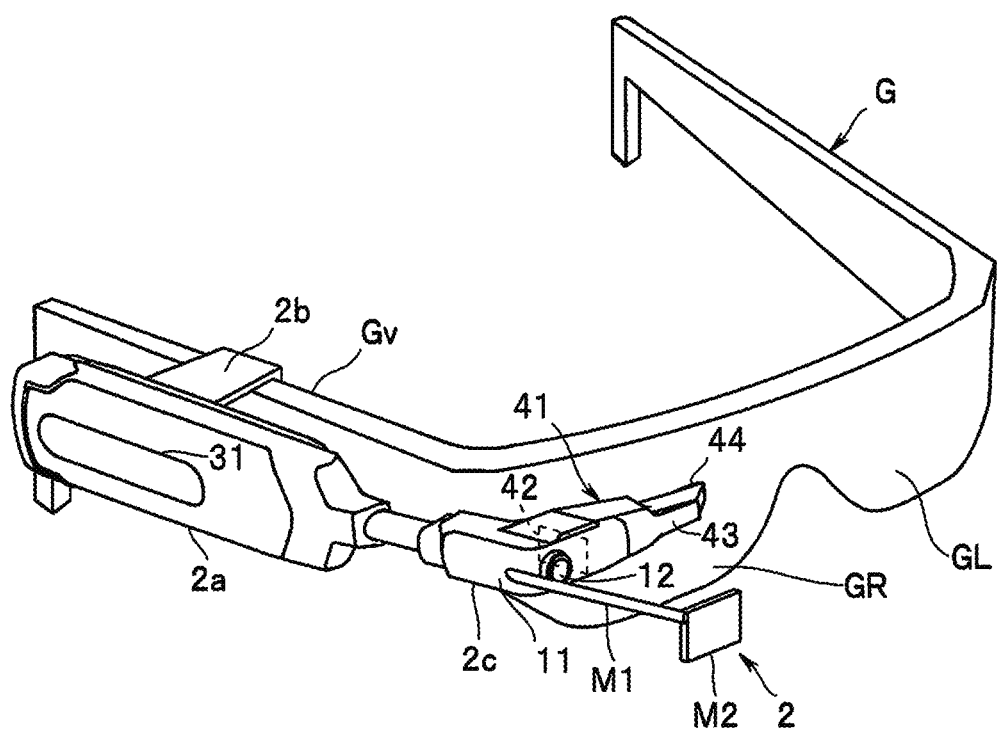
FIG. 21 is a perspective view showing an example of a wearable terminal of a work assistance apparatus, according to a second embodiment of the present invention.

FIG. 21 is a perspective view showing an example of a wearable terminal 2 of a work assistance apparatus 1 according to a second embodiment of the present invention. In the present embodiment, a description of same components as components of other embodiments and modifications will be omitted.

The wearable terminal 2 includes a mirror portion M2 supported by a support portion M1. The mirror portion M2 is disposed in front of the camera 12 and is disposed in such a manner that the eyes of the user can be taken by the camera 12.

When the eyes of the user are detected in a picked-up image inputted from the image pickup portion 11, the image determination section 72 determines which of an instruction input for icon movement and an instruction input for icon determination an action of the eyes of the user indicates, and outputs a determination result to the display control section 73.

An instruction input for icon movement is made by, for example, an action of closing both eyes for a predetermined time period. When the image determination section 72 detects the action of closing both eyes for the predetermined time period, the image determination section 72 outputs a determination result indicating an instruction input for icon movement to the display control section 73.

An instruction input for icon determination is made by, for example, an action of closing one eye for a predetermined time period. When the image determination section 72 detects the action of closing one eye for the predetermined time period, the image determination section 72 outputs a determination result indicating an instruction input for icon determination to the display control section 73.

According to the second embodiment, the work assistance apparatus 1 makes it possible to intuitionally operate the icons Ic based on an action of eyes, regardless of a display location where the icons Ic are virtually displayed, and to make an instruction input more easily without fail.

Note that in the embodiments and the modifications, the first direction D1 is a direction from an upper portion of a display image toward a lower portion of the display image, and the second direction D2 is a direction from the lower part of the display image to the upper part of the display image. However, the first direction D1 and the second direction D2 may be interchanged. Here, a description is given by using icons (display components for operation) for easy understanding. However, the present application can be applied to subject-of-display selection such as text selection, SW selection, and tab selection that can be performed, for example, by using a touch operation and a cursor operation in combination on a screen of a personal computer, a smartphone, or the like. In addition to icon selection, the present application can also be utilized for any of various actions such as a click, double clicks, a drag, and a drop, and other display elements for operation (operable display parts, parts, and display components for operation).

Note that although the display portion 41 is disposed in front of the right lens GR of the glasses G in the embodiments and the modifications, the display portion 41 may be disposed in front of the left lens GL.

In the embodiments and the modifications, an instruction input for icon movement and an instruction input for icon determination are made in the instruction input determination processing. However, for example, movement of gauges, which are display components for operation for brightness adjustment, zoom adjustment, exposure adjustment, and the like, and determination of a gauge may be performed.

Each "section" and each "portion" in the present specification are conceptual ones corresponding to each function in the embodiments, and do not necessarily correspond to specific hardware component or software routine on a one-to-one basis. Accordingly, in the present specification, the embodiments are described, supposing a virtual circuit block (section/portion) having each function of the embodiments. The steps in each procedure in the embodiments may be performed in changed order, or some of the steps may be simultaneously performed, or the steps may be performed in different order each time the steps are performed, without departing from the nature of each step in each procedure. Further, all or part of the individual steps in each procedure in the embodiments may be implemented by hardware.

The present invention is not limited to the above-described embodiments, and various changes, modifications, and the like can be made without departing from the scope and spirit of the present invention.

What is claimed is:

1. A work assistance apparatus for use with user-wearable glasses, comprising:
    a display panel configured to form a virtual display area within a field of view of a user;
    a camera configured to pick up an image in front of the user and output a picked-up image;
    a mounting portion mounting the work assistance apparatus on the user-wearable glasses;
    a touch sensor;
    a processor, wherein the processor is configured to move at least one display component for operation within a display image in the virtual display area when a finger of the user alternately moves in a frontward direction and a backward direction either (A) on the touch sensor, or (B) within the picked up image, and
    a work determination apparatus including
        a first communication section,
        a controller, and
        a storage medium storing a work-specific database,
    wherein the display panel, the camera, the mounting portion, the touch sensor, and the processor are included in a head-mounted apparatus,
    wherein the head-mounted apparatus further includes a second communication section,
    wherein responsive to a user making an instruction input for work assistance mode via the head-mounted apparatus, (1) the head-mounted apparatus sends a setting instruction and a picked-up image from the camera to the work determination apparatus, (2) responsive to receiving the setting instruction and the picked-up image, the work determination apparatus (i) compares the picked up image with at least one reference image in the work-specific database, (ii) determines whether or not a work abnormality exists, and (iii) responsive to determining that a work abnormality exists, sends a request for detailed information to the head-mounted apparatus, and
    wherein responsive to the request for detailed information, the head-mounted apparatus displays a message for the user to capture an enlarged image with the camera, and the head-mounted apparatus determines when an enlarged image is input by the camera.

2. The work assistance apparatus according to claim 1, wherein when the processor determines that the finger alternately moves in the frontward direction and the backward direction of the user, the processor moves the at least one display component for operation within the display image.

3. The work assistance apparatus according to claim 1, wherein when an instruction input is made by an operation of tapping the touch sensor, the touch sensor outputs to the processor a control signal indicating that an instruction input for display-component-for-operation determination is made, and
    in response to the control signal, the processor activates processing associated with the display component for operation.

4. The work assistance apparatus according to claim 1, wherein responsive to an instruction input made by an operation, with the finger, of touching and sliding on the touch sensor in either the frontward direction or the backward direction, the touch sensor outputs, to the processor, a control signal indicating that an instruction input is made for moving the at least one display component for operation, which includes at least one icon.

5. The work assistance apparatus according to claim 1, wherein
    (A) responsive to an instruction input made by an operation, with the finger, of touching and sliding on the touch sensor in either the frontward direction or the backward direction, the touch sensor outputs, to the processor, a control signal indicating that an instruction input is made for moving the at least one display component for operation, which includes at least one icon, or
    (B) responsive to an instruction input made by an operation, with the finger, of a frontward or backward finger gesture within the picked up image, an image determination section of the processor outputs to a display control section of the processor a determination result indicating that an instruction input is made for moving the at least one display component for operation, which includes at least one icon.

6. The work assistance apparatus according to claim 5, wherein the at least one icon is displayed in the circulated manner along an inclined elliptical orbit.

7. The work assistance apparatus according to claim 1, wherein the at least one display component for operation includes at least one icon, and the at least one icon is displayed in a circulated manner in a direction depending on a movement of the finger.

8. A work assistance method using a work assistance apparatus mounted to glasses worn by a user, the work assistance apparatus further comprising a work determination apparatus including a first communication section, a controller, and a storage medium storing a work-specific database, the work assistance method comprising:
    forming, by a display panel attached to a head of the user through a mounting portion, a virtual display area within a field of view of a user;
    picking up, by a camera attached to the head of the user through the mounting portion, an image in front of the user and outputting a picked-up image;
    moving, by a processor, at least one display component for operation within a display image in the virtual display area when a finger of the user alternately moves in a frontward direction and a backward direction of the user either (A) on a touch sensor attached to the glasses, or (B) within the picked up image;

responsive to a user making an instruction input for work assistance mode via a head-mounted apparatus, sending, by the head mounted apparatus, a setting instruction and a picked-up image from the camera to the work determination apparatus;

responsive to receiving the setting instruction and the picked-up image, comparing, by the work determination apparatus, the picked up image with at least one reference image in the work-specific database, determining, by the work determination apparatus, whether or not a work abnormality exists, and sending, by the work determination apparatus and responsive to determining that a work abnormality exists, a request for detailed information to the head-mounted apparatus; and responsive to the request for detailed information, displaying, by the head-mounted apparatus, a message for the user to capture an enlarged image with the camera, and determining, by the head-mounted apparatus, that an enlarged image is input by the camera, wherein the display panel, the camera, the mounting portion, the touch sensor, and the processor are included in the head-mounted apparatus, wherein the head-mounted apparatus further includes a second communication section.

9. The work assistance method of claim 8, further comprising:

outputting, by the touch sensor and to the processor, responsive to an instruction input made by an operation with the finger of touching and sliding on the touch sensor in either the frontward direction or the backward direction, a control signal indicating that an instruction input for moving a display component for operation including at least one icon is made, and moving in a circulated manner, by the processor, and in response to the control signal from the touch sensor, the display component for operation including the at least one icon in a counterclockwise direction of a rotational orbit within the display image so as to correspond to the movement of the finger of the user in the frontward direction, and the display component for operation including the at least one icon in a clockwise direction of the rotational orbit within the display image so as to correspond to the movement of the finger of the user in the backward direction.

10. The work assistance method of claim 8, further comprising:

(A) responsive to an instruction input made by an operation with the finger of touching and sliding on the touch sensor in either the frontward direction or the backward direction, outputting by the touch sensor to the processor a control signal indicating that an instruction input for moving a display component for operation including at least one icon is made, and moving in a circulated manner, by the processor, and in response to the control signal, the display component for operation including the at least one icon in a counterclockwise direction of a rotational orbit within the display image so as to correspond to the movement of the finger of the user in the frontward direction, and the display component for operation including the at least one icon in a clockwise direction of the rotational orbit within the display image so as to correspond to the movement of the finger of the user in the backward direction, or (B) responsive to an instruction input made by an operation, with the finger, of a frontward or backward finger gesture within the picked up image, outputting by an image determination section of the processor to a display control section of the processor a determination result indicating that an instruction input is made for moving the at least one display component for operation, which includes at least one icon, and moving in a circulated manner, by the processor, and in response to the determination result, the display component for operation including the at least one icon in a counterclockwise direction of a rotational orbit within the display image so as to correspond to the frontward finger gesture within the picked up image, and the display component for operation including the at least one icon in a clockwise direction of the rotational orbit within the display image so as to correspond to the backward finger gesture within the picked up image.

11. A system, comprising a computer-readable, non-transitory recording medium recording a work assistance program for use with a work assistance apparatus mounted to glasses worn by a user, the program causing a computer to execute:

a code configured to form, by a display panel attached to a head of the user through a mounting portion, a virtual display area within a field of view of a user;

a code configured to pick up an image in front of the user and output a picked-up image; and a code configured to move at least one display component for operation including at least one icon within a display image in the virtual display area when a finger of the user alternately moves in a frontward direction and a backward direction of the user either (A) on a touch sensor, or (B) within the picked up image, wherein the touch sensor is attached, via the mounting portion, to the glasses; and the work assistance apparatus, further comprising:

a work determination apparatus including
a first communication section,
a controller, and
a storage medium storing a work-specific database, wherein the display panel, the mounting portion, the touch sensor, a camera, and a processor are included in a head-mounted apparatus, wherein the head-mounted apparatus further includes a second communication section, wherein, responsive to a user making an instruction input for work assistance mode via the head-mounted apparatus, (1) the head-mounted apparatus sends a setting instruction and a picked-up image from the camera to the work determination apparatus, (2) responsive to receiving the setting instruction and the picked-up image, the work determination apparatus (i) compares the picked up image with at least one reference image in the work-specific database, (ii) determines whether or not a work abnormality exists, and (iii) responsive to determining that a work abnormality exists, sends a request for detailed information to the head-mounted apparatus, and wherein responsive to the request for detailed information, the head-mounted apparatus displays a message for the user to capture an enlarged image with the camera, and the head-mounted apparatus determines that an enlarged image is input by the camera.

12. The word assistance method of claim 11, wherein the program further causes a computer to execute:

a code configured to
(A) responsive to a touch sensor detecting an instruction input made by an operation, with the finger, of touching and sliding on the touch sensor in either the frontward direction or the backward direction, move the display component for operation in a counterclockwise direction of a rotational orbit within the display image so as to correspond to the movement of the finger of the user on the touch sensor in the frontward direction, and move the display component for operation in a clockwise direction of the rotational orbit within the display image so as to correspond to the movement of the finger of the user on the touch sensor in the backward direction, to display the one icon in a circulated manner, or
(B) responsive to a frontward or backward finger gesture within the picked up image, move the display component for operation in a counterclockwise direction of a rotational orbit within the display image so as to correspond to the frontward gesture within the picked up image, and move the display component for operation in a clockwise direction of the rotational orbit within the display image so as to correspond to the backward gesture within the picked up image, to display the one icon in a circulated manner.

* * * * *